United States Patent [19]

Hathaway

[11] 4,099,211
[45] Jul. 4, 1978

[54] POSITIONABLE TRANSDUCING MOUNTING STRUCTURE AND DRIVING SYSTEM THEREFOR

[75] Inventor: Richard Allen Hathaway, Saratoga, Calif.

[73] Assignee: Ampex Corporation, Redwood City, Calif.

[21] Appl. No.: 722,822

[22] Filed: Sep. 13, 1976

[51] Int. Cl.² ............... G11B 5/52; H04N 5/78; G11B 21/18; G11B 21/10
[52] U.S. Cl. .................... 360/109; 360/76; 360/77; 360/107
[58] Field of Search ............ 360/77, 75, 108, 109, 360/71, 113, 70, 76

[56] References Cited

U.S. PATENT DOCUMENTS

| | | | |
|---|---|---|---|
| 3,126,535 | 3/1964 | Streeter | 360/70 |
| 3,526,726 | 9/1967 | Corbett et al. | 360/113 |
| 3,748,408 | 7/1973 | Warren | 360/84 |
| 3,787,616 | 1/1974 | Falk | 360/75 |
| 3,994,018 | 11/1976 | Kihara et al. | 360/105 |

FOREIGN PATENT DOCUMENTS

| | | | |
|---|---|---|---|
| 1,275,580 | 8/1968 | Fed. Rep. of Germany | 360/70 |
| 387,423 | 6/1973 | U.S.S.R. | 360/75 |
| 402,914 | 10/1973 | U.S.S.R. | 360/77 |

OTHER PUBLICATIONS

IBM Tech. Disc. Bull., Price, Video Tape Recorder with Oscillating Head, vol. 12, No. 1, Jun. 1969, pp. 33-34.

*Primary Examiner*—Alfred H. Eddleman
*Attorney, Agent, or Firm*—Robert G. Clay; Charles M. Carman, Jr.

[57] ABSTRACT

In a system mounting a magnetic transducer on the end of a thin leaf for sweeping motion displacement laterally to a track on a record surface, the present invention utilizes elements arranged as reversely deflectable leaf portions so as to maintain the transducer in substantially undeviating (normal) orientation with respect to the record surface. In one embodiment, the cantilevered leaf is composed of inner and outer (inboard and outboard) piezoelectric ("bimorph") bender elements having opposite polarizations and being cross-wired to produce the reverse deflections desired. The electrodes of the elements may also be divided longitudinally and coupled to bias voltage sources to provide controlled correction of azimuth error.

39 Claims, 35 Drawing Figures

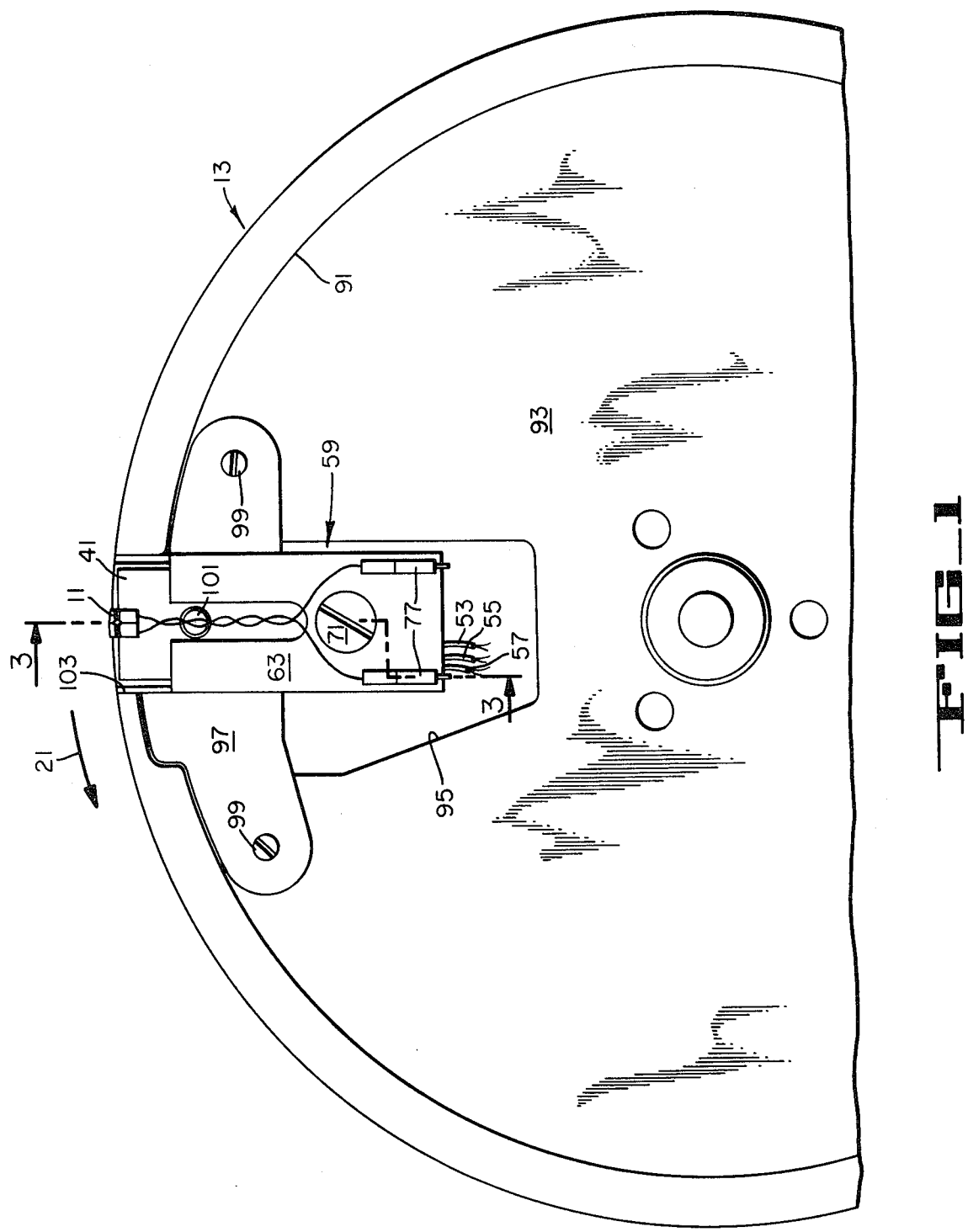

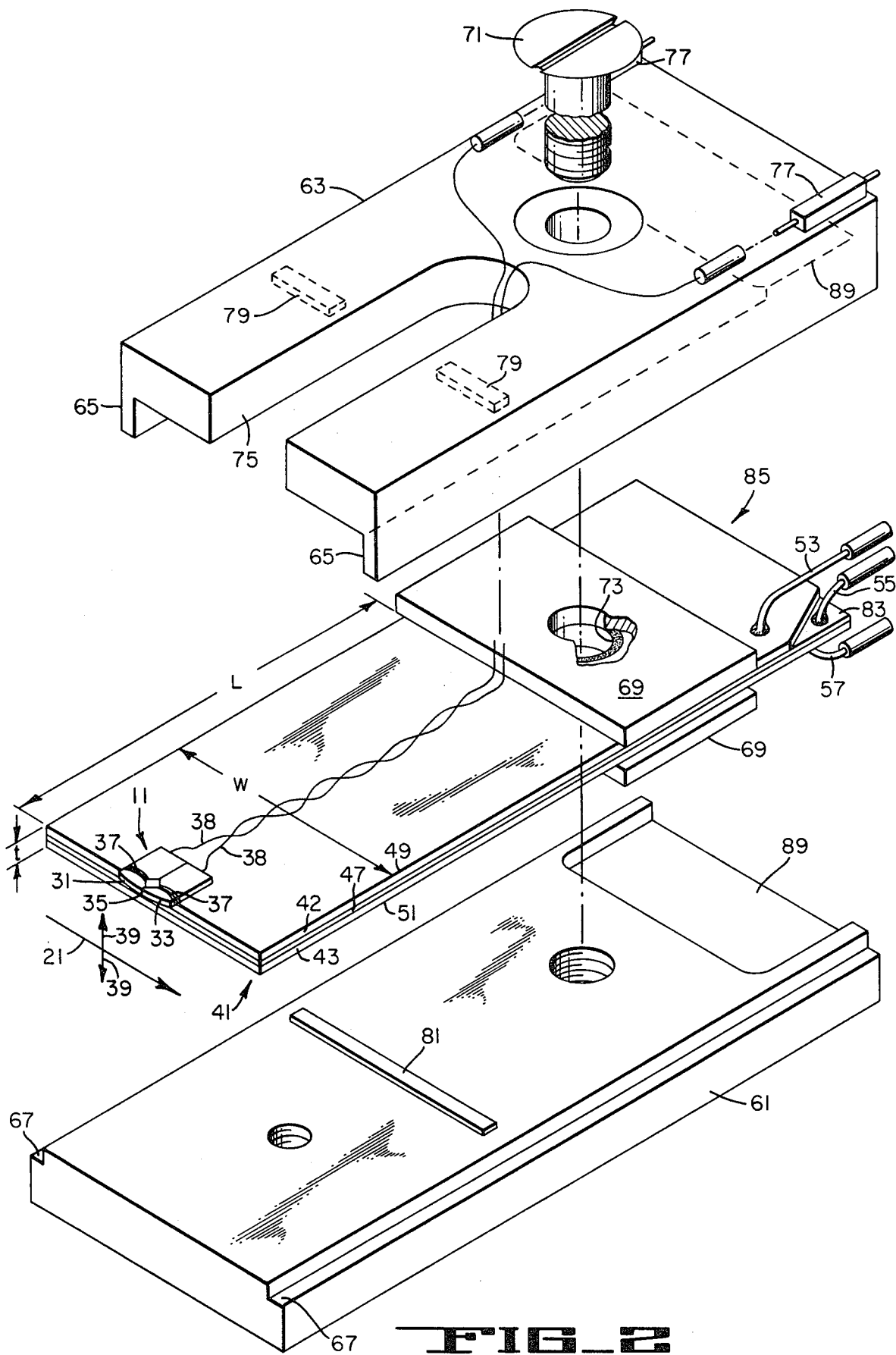
FIG_2

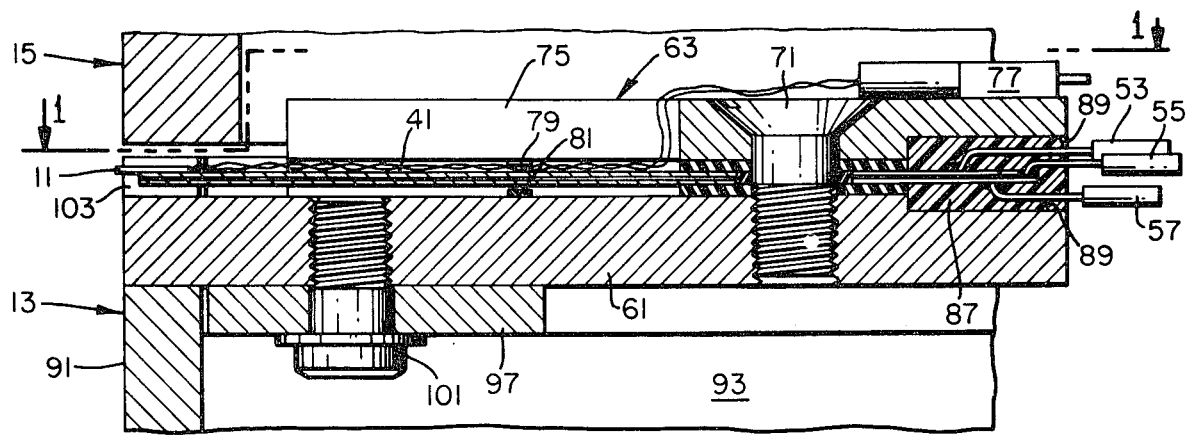
FIG_3
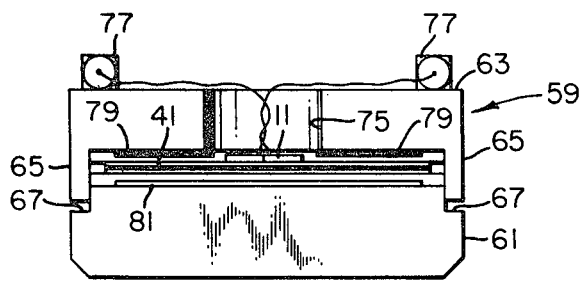
FIG_4
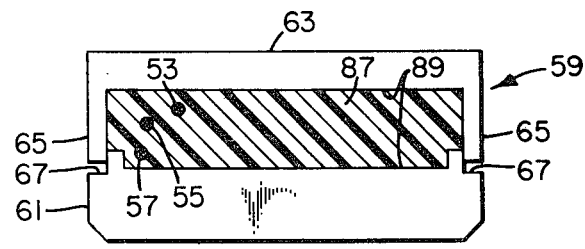
FIG_5
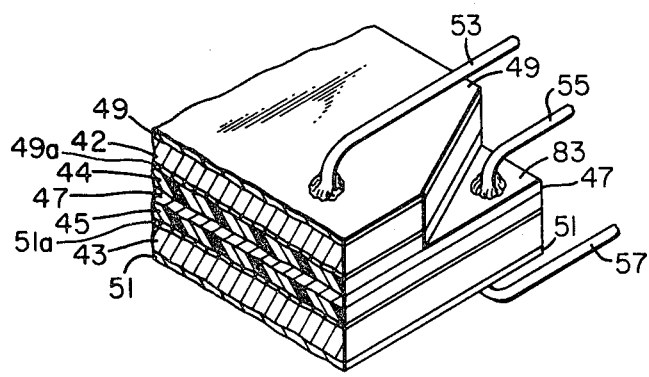
FIG_6
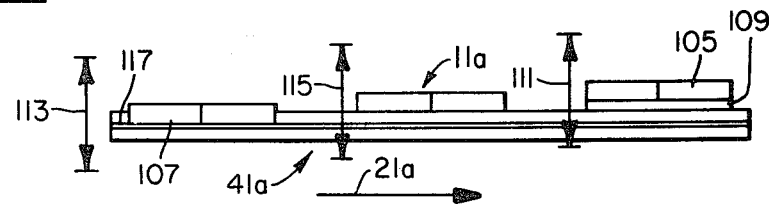
FIG_7

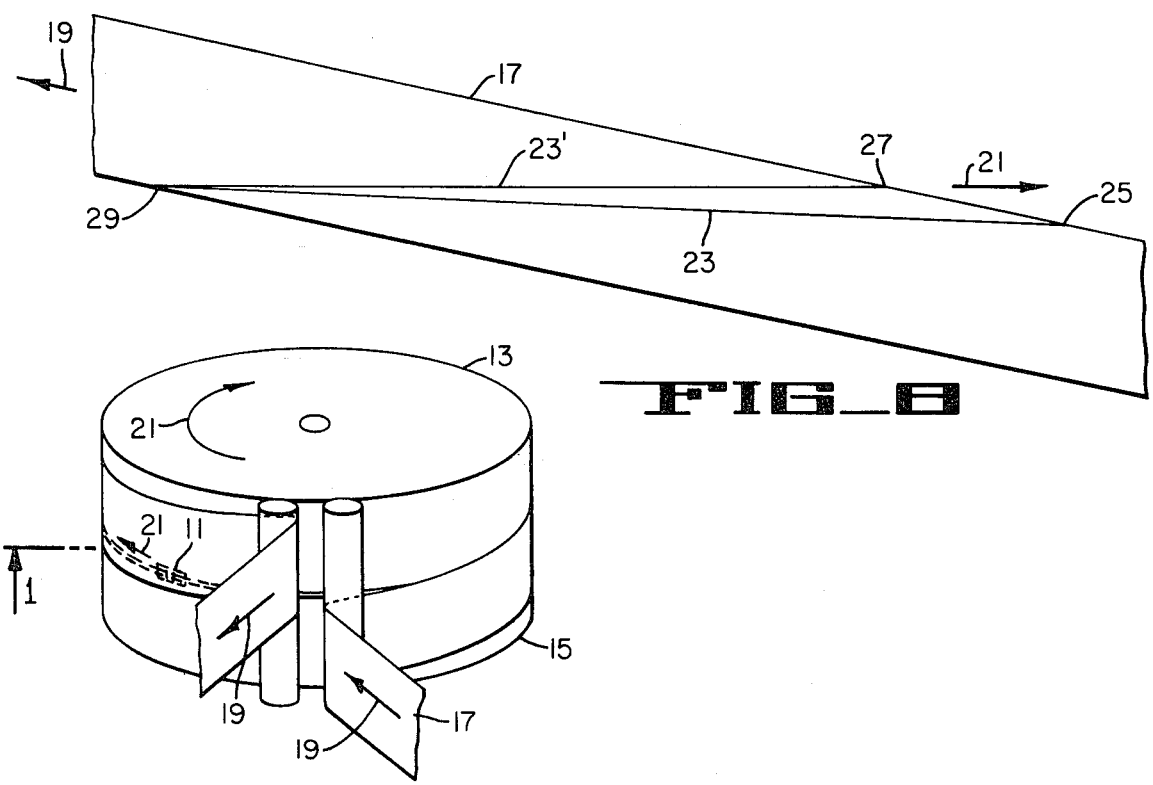
FIG_8
FIG_9

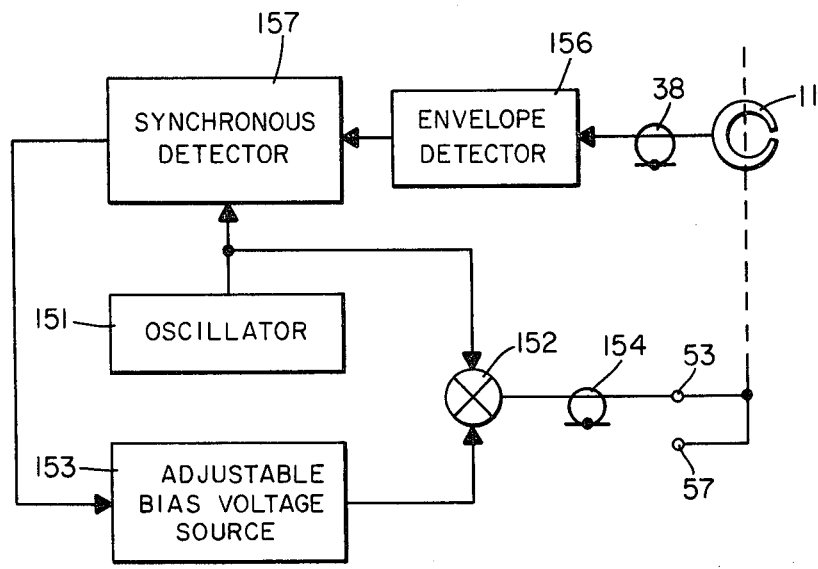
FIG_10A
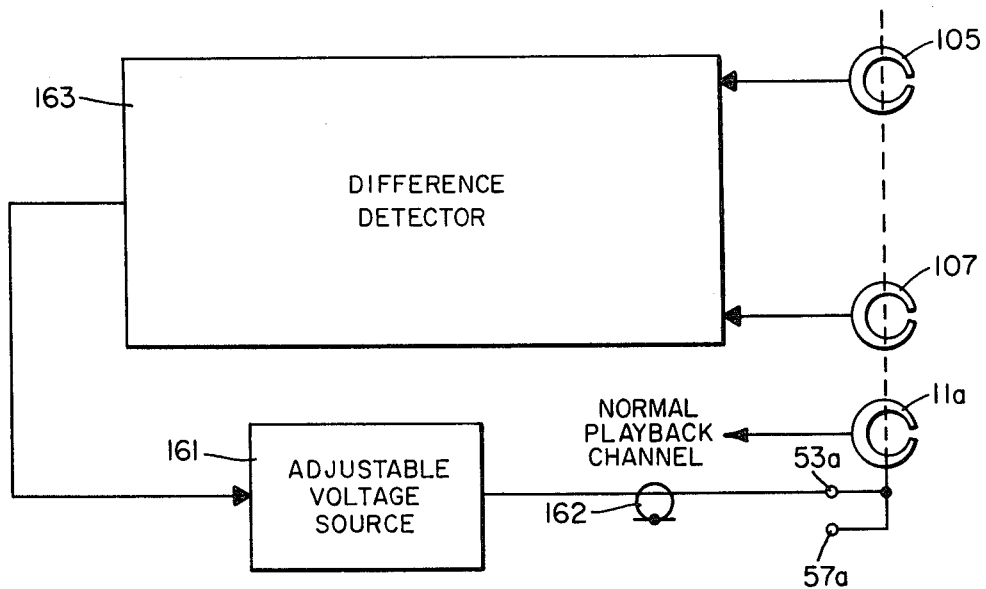
FIG_10B

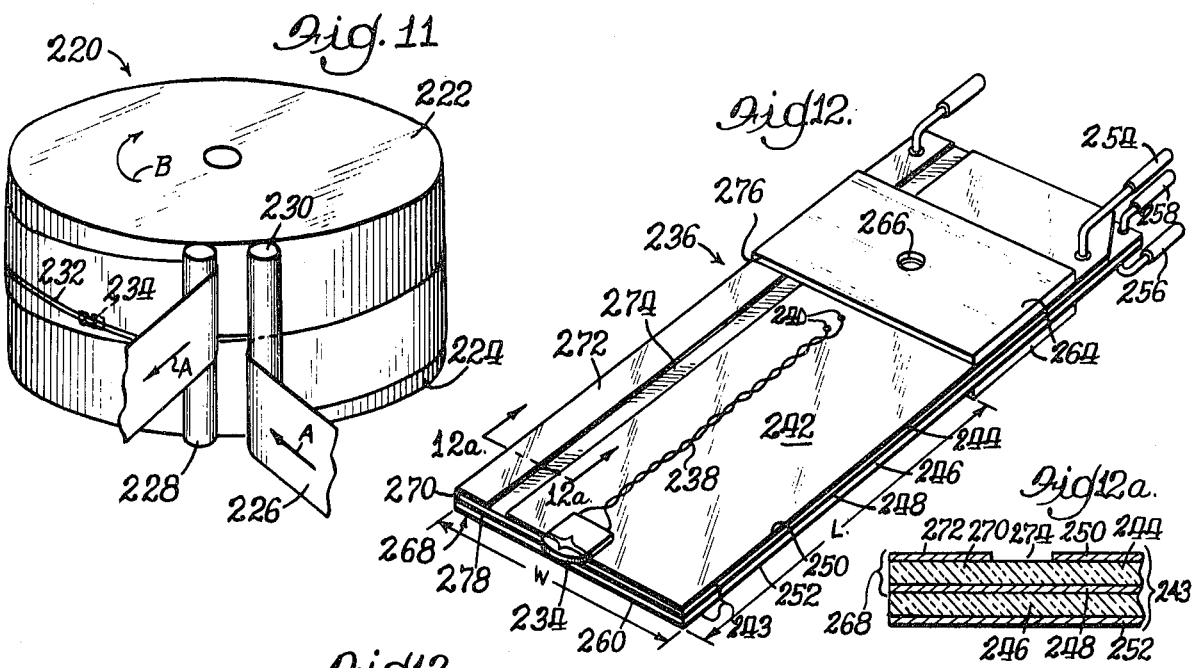
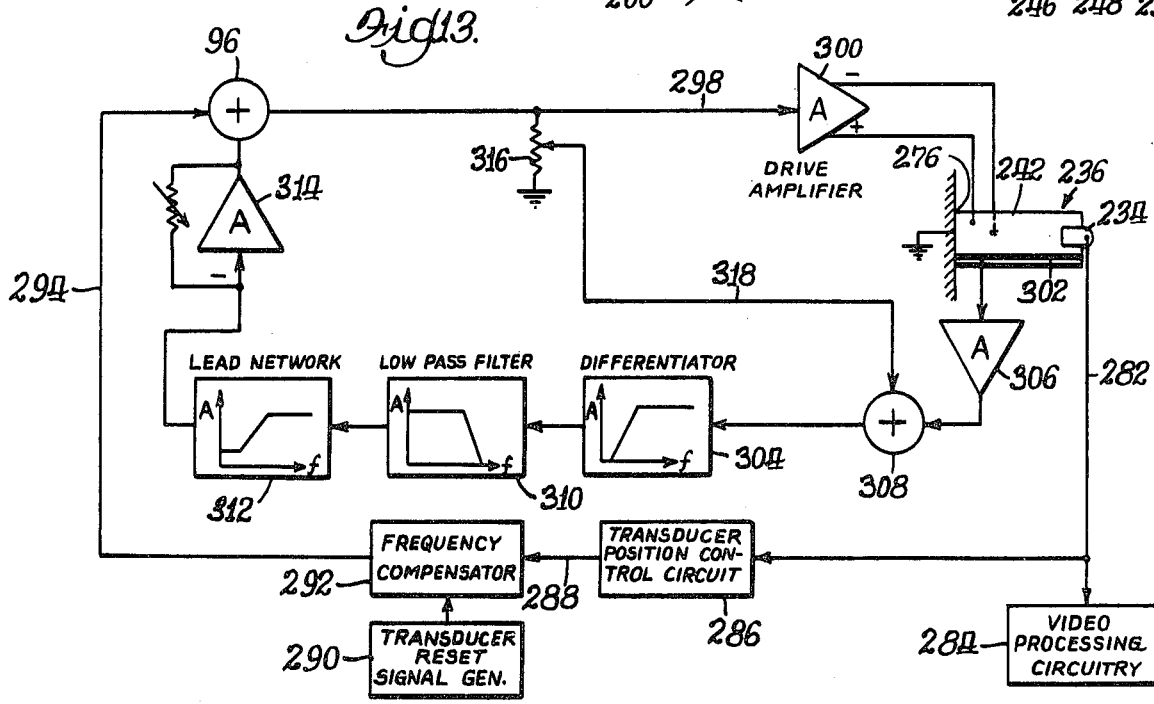
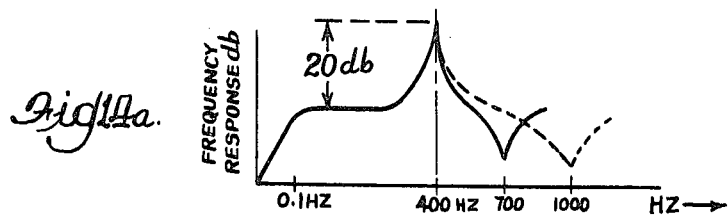
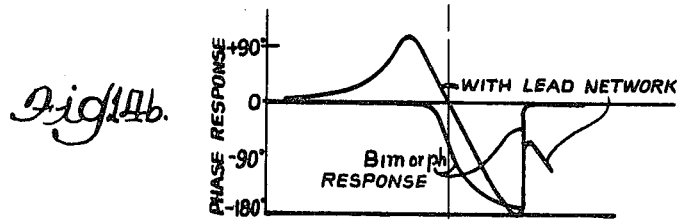

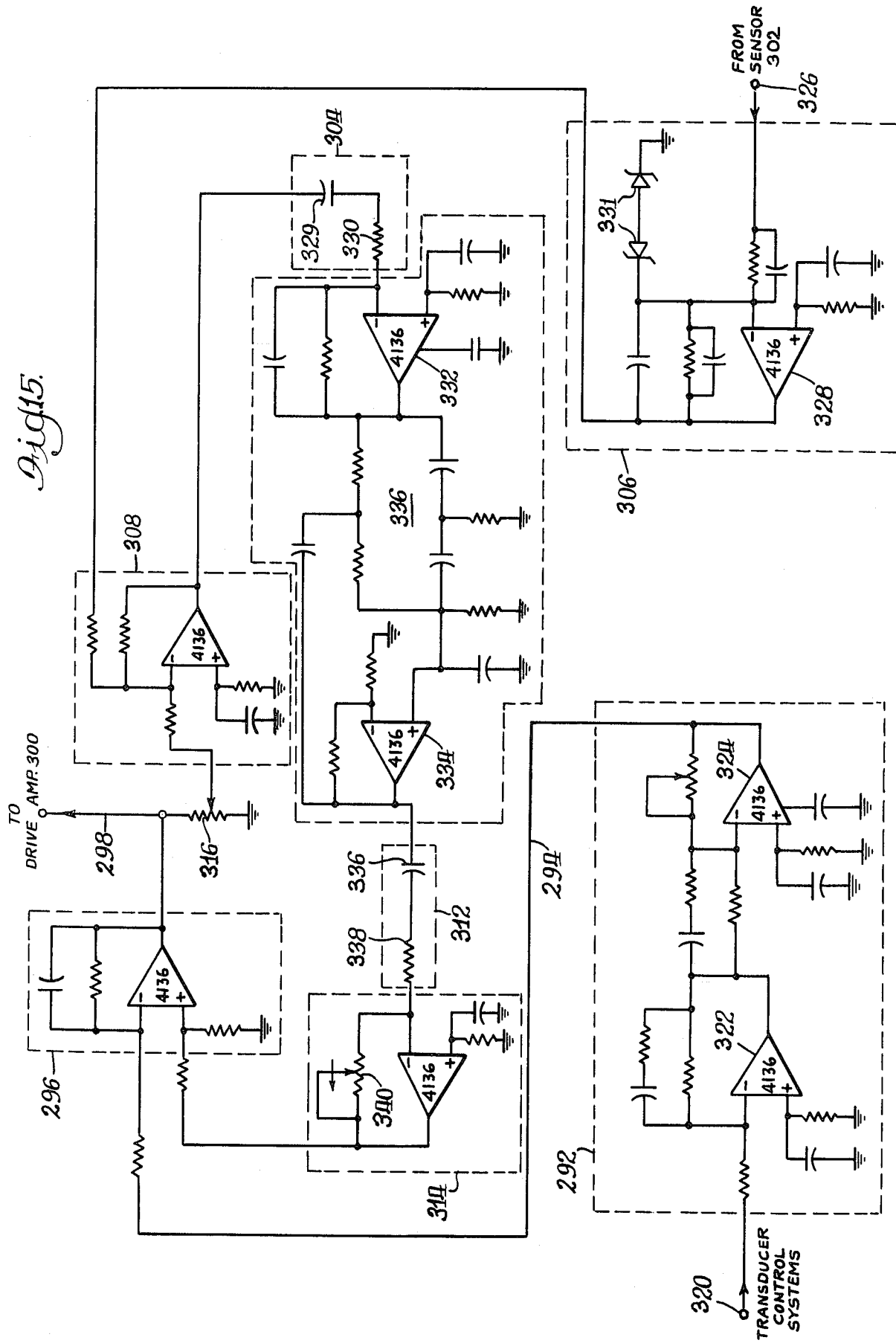

UP DEFLECTION (PRIOR ART)    NO DEFLECTION (PRIOR ART)    DOWN DEFLECTION (PRIOR ART)

UP DEFLECTION    NO DEFLECTION    DOWN DEFLECTION

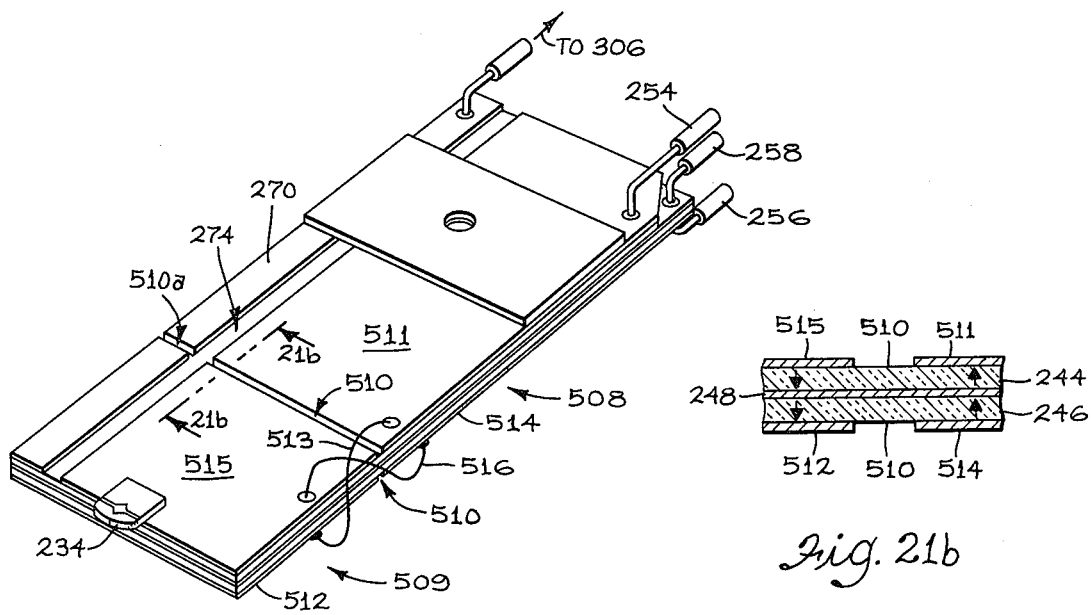
Fig. 21a
Fig. 21b
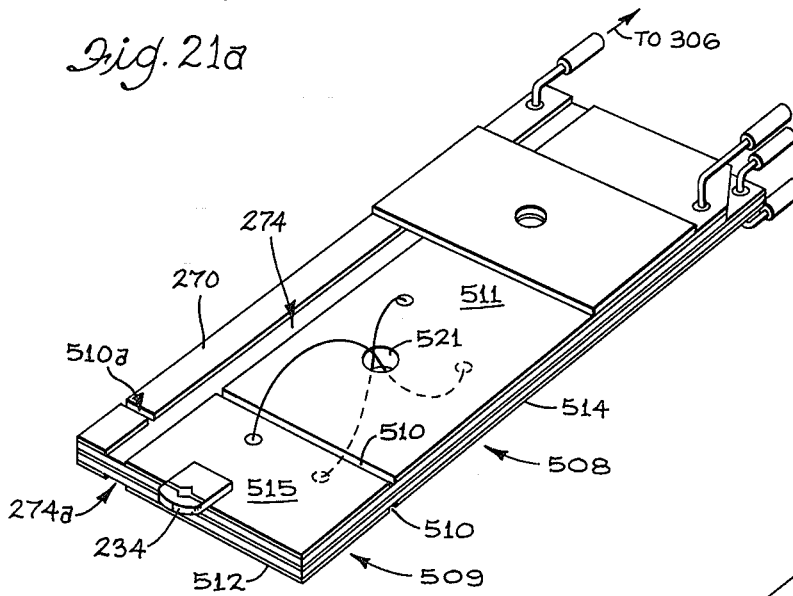
Fig. 21c
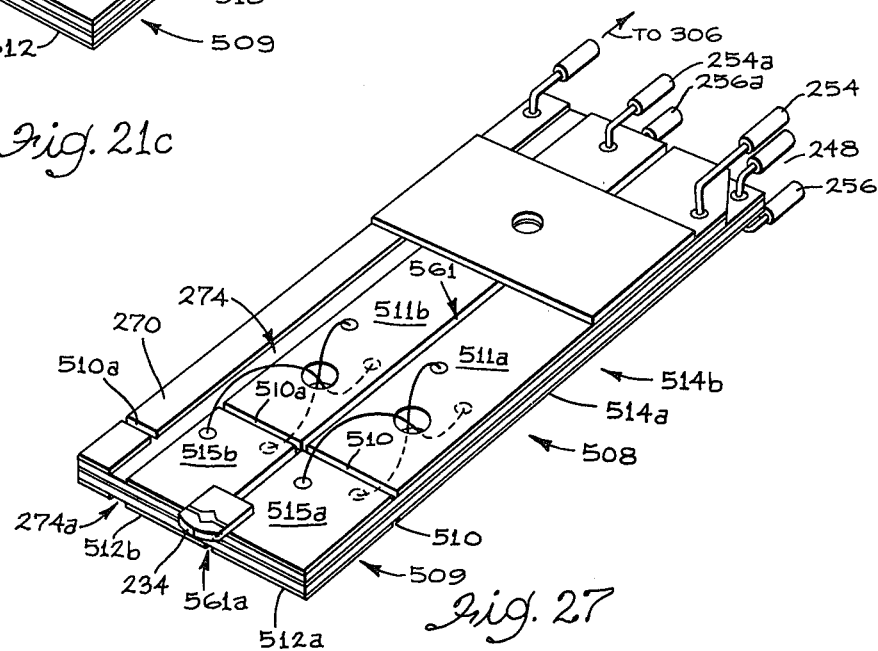
Fig. 27

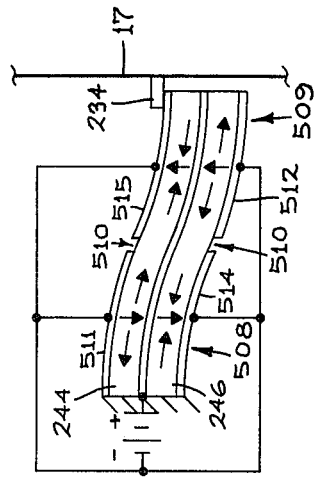
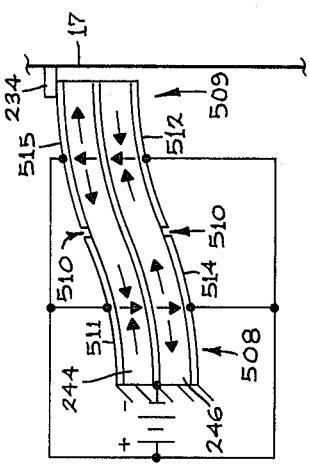
Fig. 22
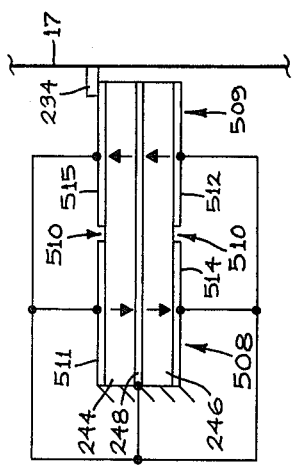
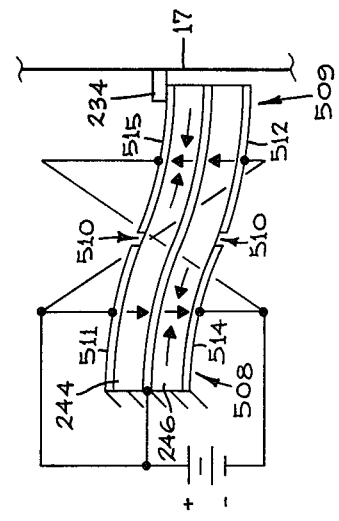
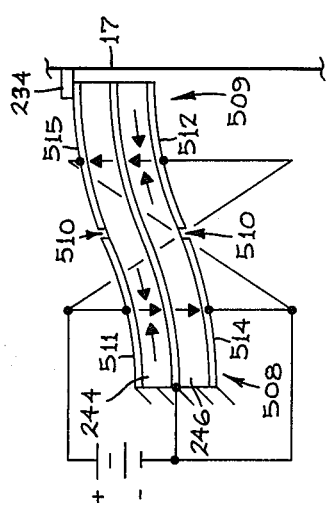
Fig. 23
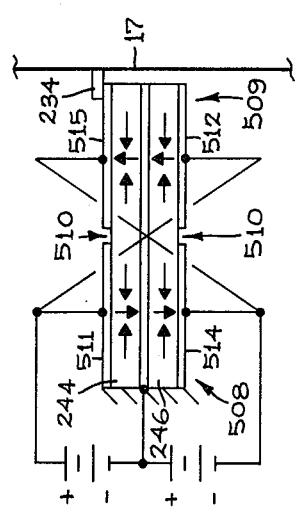

1

POSITIONABLE TRANSDUCING MOUNTING STRUCTURE AND DRIVING SYSTEM THEREFOR

BACKGROUND OF THE INVENTION

This invention relates to positionable transducer mounting structures and driving systems therefor, and particularly to such structures and systems providing for sweeping motion of the transducer laterally to an elongated track upon a record medium surface.

Co-pending U.S. patent applications Ser. No. 668,571, AUTOMATIC SCAN TRACKING by Richard Allen Hathaway; Ser. No. 669,047, AUTOMATIC SCAN TRACKING by Raymond F. Ravizza et al; Ser. No. 677,815, METHOD AND APPARATUS FOR PRODUCING SPECIAL MOTION EFFECTS IN VIDEO RECORDING AND REPRODUCING APPARATUS by Richard Allen Hathaway et al; Ser. No. 677,683, TRANSDUCER ASSEMBLY VIBRATION SENSOR by David Edward Brown; and Ser. No. 668,651, POSITIONABLE TRANSDUCER MOUNTING STRUCTURE by Richard Allen Hathaway, disclose various forms of apparatus in which a positionable element, particularly a piezoelectric (bimorph) bender assembly, is mounted to support a magnetic transducing head for sweeping motion laterally to a recorded track on a magnetic record medium. Some of the material from these applications is incorporated by transcription hereinbelow to aid in the understanding of the background of the present invention. Briefly, however, it may be said that under certain circumstances, as when adapting the basic structure for "P.A.L." or European television systems, rather than for the "N.T.S.C." or U. S. type systems, in which the structures were first employed, certain difficulties arise from the fact that the head in its sweeping pivoting motion across the record medium, bears first on one side at one extreme of the sweep, then squarely, in the middle of the sweep, and then on the other side at the other extreme of the sweep. At the sweep extremes, the head-to-record medium contact is less, resulting in decreased signal coupling, termed "zenith error".

In addition, it has been found that if care is not taken in attaching the positionable element to its support, azimuth errors are often introduced as a result of the gap of the magnetic head being angularly displaced or skewed from its normal transverse orientation to the longitudinal dimension of the recorded track. Azimuth errors reduce the capability of the system in handling signals of short wavelengths.

Further details of the problem and of its solution will be better understood after reading the following excerpts from various of the above-mentioned patent applications, which material has not yet been elsewhere published.

Accordingly, it is an object of the invention to provide an improved mounting and driving system for a magnetic transducing head sweeping laterally of a track upon a record medium, wherein predetermined orientation and azimuth of the head with respect to the track may be controllably maintained.

SUMMARY OF THE INVENTION

This and other objects are accomplished in the present invention, which includes a transducer positionable device that utilizes elements arranged as reversely deflectable portions so as to decrease the inclination of the facing surface of the transducer with respect to the record medium surface as the positionable device transversely displaces the transducer. Preferably, the reversely deflectable portions are arranged to maintain the transducer in substantially undeviating (normal) orientation with respect to the record surface. In one embodiment, a cantilevered leaf is composed of inner and outer (inboard and outboard) piezoelectric ("bimorph") bender elements having opposite polarizations and being crosswired to produce the reverse deflections desired. The electrodes of the elements may also be divided longitudinally and coupled to bias voltage sources to provide controlled correction of azimuth error.

BRIEF DESCRIPTION OF THE DRAWINGS

FIG. 1 is a plan view of a magnetic head drum for helical tape recording use, showing the basic apparatus mounted thereon;

FIG. 2 is an exploded perspective view, to an enlarged scale, of a portion of the structure shown in FIG. 1;

FIG. 3 is an enlarged sectional view taken on the plane of lines 3—3 of FIG. 1;

FIG. 4 is a left-end elevation view of a portion of the structure shown in FIG. 3;

FIG. 5 is a right-end elevation view of a portion of the structure shown in FIG. 3;

FIG. 6 is an enlarged fragmentary perspective view illustrating a portion of the structure shown in FIG. 3;

FIG. 7 is an enlarged left-end view of a portion of the structure shown in FIG. 3, illustrating an arrangement of a plurality of transducers thereon;

FIG. 8 is an elevation view of a portion of tape;

FIG. 9 is a reduced scale view of the tape of FIG. 8 enwrapped around a scanning mechanism including the structure of FIG. 1;

FIGS. 10A and 10B are schematic block diagrams of alternative embodiments for sensing and controlling the position of supported transducers relative to a record surface;

FIG. 11 is a perspective view of a portion of a helical videotape recorder simplified for the sake of clarity and particularly illustrating a rotatable scanning drum and read head;

FIG. 12 is a perspective view of a read transducer assembly;

FIG. 12A is an enlarged cross-section of a portion of the transducer assembly shown in FIG. 12 and illustrating the layered construction of the assembly;

FIG. 13 is a block diagram of a feedback control system for controlling vibrations in a bimorph read transducer assembly;

FIGS. 14A and 14B graphically illustrate the frequency and phase response of the bimorph transducer assembly used in the control system of FIG. 13;

FIG. 15 ia a schematic diagram of the control system illustrated in FIG. 13;

FIG. 21A is a perspective view of a positionable head mounting assembly in accordance with the present invention;

FIG. 21B is an enlarged fragmentary cross-section taken along the plane of lines 21b—21b of FIG. 21A, illustrating a layered construction in accordance with the present invention;

FIG. 21C is a perspective view of a variational form of the structure of FIG. 21A;

FIG. 22 is a schematic development illustrating a form of the inventive structure in operation;

FIG. 23 is a schematic development illustrating another form of the inventive structure in operation;

FIG. 27 is a perspective view illustrating a further variational form of the invention.

THE BASIC HEAD MOUNTING STRUCTURE

Figure 16:
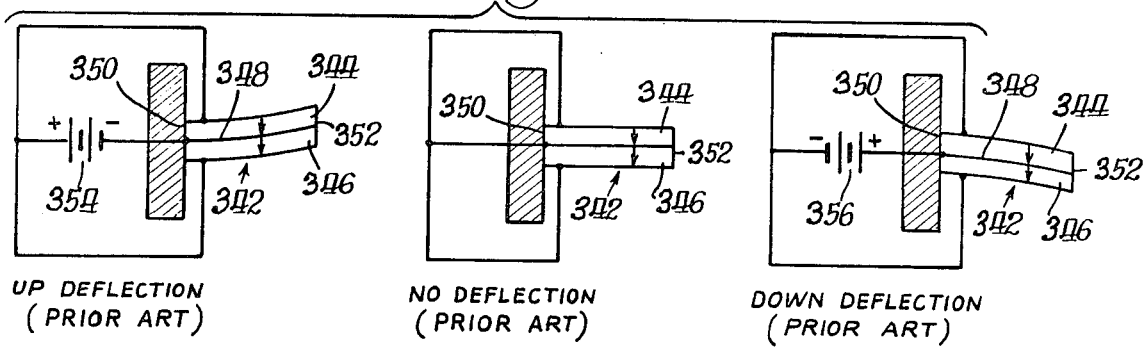
FIG. 16 shows prior art methods of deflecting a bimorph.

Broadly stated, the apparatus upon which the present invention is an improvement is directed to transducer mounting structures in which a transducer is adapted to continuously controlled positioning use where there is relative motion with respect to a record surface. The structure is useful in many different types of recording environments, such as, for example, magnetic drum or disc recording, longitudinal magnetic tape recording as used for computer, audio and instrumentation purposes and segmental rotating head magnetic tape recording for broad band data and/or television signal recording. However, the features of the invention are particularly advantageous for segmental recording of data on magnetic tape by means of one or more magnetic heads rotated at a high speed relative to the tape. While there have been many different recording formats that have been developed, the format in which video or other similarly wide band signals are recorded on magnetic tape as it is transported in a helix around a cylindrically-shaped scanning drum has exhibited many distinct advantages in terms of relative simplicity of the tape transport drive and control mechanism, the necessary electronics involved, the number of transducing heads and the efficient use of tape, in terms of the quantity of tape that is required for recording a given amount of material. By helically wrapping the tape around a rotating scanning head, a single transducing head for reproducing or playing the information that is recorded on the tape can be utilized. When a single head is used in a helical tape recording apparatus, two recognized alternatives are available for wrapping the scanning head, and are generally referred to as the "alpha" wrap and the "omega" wrap apparatus.

The alpha wrap has the tape introduced from one side and wrapped completely around the drum so that it exits on the opposite side and is referred to as the alpha wrap for the reason that it generally conforms to the Greek symbol alpha ($\alpha$) when one views the arrangement from above. The omega wrap introduces the tape by bringing it toward the drum in a generally radial direction and passes it around a guide to bring it in contact with the surface of the drum, helically wraps the tape around the drum, passes it around another guide so that it also exits the drum also in a generally radial direction. The tape generally conforms to the shape of the Greek symbol omega ($\Omega$) when it is viewed from above. Both of these configurations are helical wrapped in that the tape is wrapped around the scanning drum in a helical manner with the tape exiting the drum surface at a different axially displaced position relative to the entry thereof. In other words, if the drum is vertically oriented, the tape leaves the drum surface either higher or lower than when it first contacts the surface. The video information signals are recorded on discrete parallel tracks that are positioned at an angle relative to the longitudinal direction of the tape so that a track length greatly in excess of the width of the tape can be achieved. The angular orientation of the recorded tracks are a function of both the speed of the tape being transported around the scanning drum as well as the speed of rotation of the scanning drum itself. The resultant angle therefore varies depending upon the relative speeds of both the rotating scanning drum and the tape being transported.

While the present apparatus will be specifically described in connection with an omega wrap helical video tape recording apparatus, it is equally applicable to an alpha wrap helical tape recording apparatus. Additionally, while the present apparatus will be described in conjunction with a 360° omega wrap apparatus (it being understood that the tape does not contact the scanning drum a full 360° because of tape entrance and exit dimensional requirements), the present invention is also applicable to helical video tape recorders which utilize less than 360° wrap, e.g., a 180° wrap tape path apparatus having more than one head. It should also be understood that the present apparatus is applicable to arrangements where the scanning drum can move in either rotational direction and the tape can be introduced either above or below the exit path and moved around the scanning drum in either direction. The relationships of head rotation, tape transport direction and manner of tape guiding, i.e., introducing the tape above or below the path of its exit, can represent up to eight different configurational relationships of which only one will be specifically described herein as shown by the direction of the arrows 19 in FIG. 9 of the drawings.

Referring now to FIG. 1, there is shown a magnetic (head) transducer 11, mounted for recording and subsequently reading an information track upon a relatively moving recording medium. The mounting structure for the head 11 permits precise, continuous positioning of the head, which structure is useful in many different types of recording environments. However, the structure is found to be especially suited for use in error-free positioning of heads of helical scan type magnetic tape recording/reproducing machines where large forces that act on the heads tend to promote undesirable displacements of the heads movable relative to the rotating head carrier. Therefore, the helical scan type machine as operated in a reproduce mode has been selected for illustrative purposes and FIG. 1 shows a preferred embodiment thereof as intended for use with a single transducer. It is not intended to limit the apparatus to helical scanning use since the advantages of the apparatus in such applications are also useful in other applications; however, before describing the actual apparatus, it will be useful to describe the helical scanning structure shown in FIGS. 1, 3, 8 and 9, and the tracking problems associated therewith.

Briefly, the head 11 can be mounted on a separate support comprising a scanning drum carrier for rotation coaxially between two stationary guide drums, most commonly cylindrical or on a support here shown as a rotatable upper guide drum 13 associated with a stationary lower guide drum 15 as in FIG. 9. A magnetic tape 17 is helically wrapped in an omega configuration substantially 360° around the drums 13, 15 for scanning by the head 11. The tape 17 is guided, tensioned and moved (arrows 19) by means not shown but well known in the art so that the head 11 carried by drum 13, rotating in direction 21 opposite the direction of tape transport about the guide drums, scans a series of oblique transverse paths 23 of which only one is shown in FIG. 8. It will be seen in FIG. 8 that point 25 of the tape moves to the position indicated at 27, while head 11 scans the tape between point 29 and point 25. The resultant path on the tape (called "track") is the line 23 from point 29 to point 25. The line 23 may also be termed the "direction of relative movement" between the head 11 and tape 17. In practice, the line or track 23 may be slightly S-shaped, for reasons which have nothing to do with the invention and, therefore, for simplicity of explanation the track 11 is illustrated as being straight. It should be appreciated that if the head 11 rotates in the same direction as that of the movement of the tape about the guide drums 13, 15, point 27 of the tape moves to the position indicated at 25, while head 11 scans between point 29 and point 27. Line 23' becomes the resultant track, however, this change in track position does not alter the implementation of the present invention.

As previously mentioned, the tape is guided under tension so that recording occurs under a recommended standard value of longitudinal tension, which induces a certain degree of stretching of the tape. If the tape is played back at a different tension because of faults in the tensioning mechanism, or because of unavoidable variations in the mechanisms of different machines, then the length, straightness and inclination of track 23 will be different, and the head 11 will not perfectly follow the track, leading to undesirable variations in the strength of the reproduced signal and other problems. A similar effect results if the correct tension is used on playback, but the tape has shrunk or elongated due to changes in atmospheric or storage conditions, e.g., temperature or humidity. Also, irregular tape edges and differences in edge-guiding effects from machine to machine, can cause irregularly wandering tracks or scans.

The head 11 is mounted on an extremely low-mass deflectable element, to enable it to be moved rapidly, substantially lateral to a desired track, such as a track of recorded information on a magnetic medium, while at the same time the head and its entire mounting is moved, or the recording surface is moved, or both are moved, in such a way that there is relative motion between the head and the recording surface in the direction of the desired track. This is the condition in which the head scans or follows the desired track. In one embodiment of the present invention, the deflectable mounting is a thin leaf lying substantially in a plane that is normal to a plane tangent to the recording surface at the point of head-to-record surface interface and substantially parallel to the direction of relative motion.

Continuing now the description of the apparatus, it will be seen from FIG. 9 that the head 11 is fitted to the lower portion of drum 13. The view of FIG. 1 is therefore taken from the bottom of drum 13, looking upward, as illustrated by the arrows 1—1 of FIGS. 9 and 3, and the views of FIGS. 2 and 3 are also taken upside down, i.e., with the drum 13 below and the drum 15 above, for the purpose of making the description easier to follow.

Head 11 is extremely small and of low mass (on the order of 100 milligrams), and consists of two pole pieces 31 and 33, confronting one another across a non-magnetic transducing gap 35 for recording and/or reproducing signals with respect to the tape. The gap 35 is aligned with the length thereof substantially parallel to the direction 21 of drum 13 movement relative to the tape 17. It will be understood that in the magnetic recording art the "length" of the gap is the dimension from pole face to pole face, in the direction of relative recording motion. Usually, the "width" of gap is aligned transversely to the relative motion direction and parallel to the recording surface, and the "depth" of the gap is normal to the recording surface. If for any reason the gap is inclined to the direction of relative motion, the length is still defined (at least for purposes of this invention) to be in the direction of relative motion, while the width and depth dimensions are still taken as being orthogonal to the length. Signals are carried to or from the head 11 by means of pole piece windings 37 and leads 28. Signals are coupled between the magnetic head 11 and the recording surface passing the gap 35 through a coupling path that extends between the two pole pieces 31 and 33 through the recording surface in the direction of relative motion, hence the desired track on the surface.

To provide for tracking movement of the head 11 transverse (arrows 39) to the direction 21 of the drum 13 movement, the head is mounted or bonded, as by epoxy, to one flat side of a positioning member including a thin deflectable leaf element 41, here shown by way of example as a piezoelectric ceramic bender element. In the apparatus discussed in detail hereinafter with reference to the drawings, the positionable element includes a cantilever mounted piezoelectric ceramic bender element either manufactured by Vernitron Corp. and identified as PZT-5HN Bender Bi-Morph Poled For Parallel Operation or by Gulton Industries and identified as G 1278 Piezoceramic Bender Element Poled For Parallel Operation. As shown in greater detail in FIG. 6, the leaf element 41 is composed of two piezoelectric ceramic members 42 and 43, sandwiched and bonded between electrode members (nickel or silver) 49, 49A, 51 or 51A and conductively bonded as by epoxy layers 44 and 45 to opposite sides of a brass vane member 47. The ceramic members 42, 43 are cut and oriented with their axes of polarization vertically aligned (i.e., parallel to arrows 39 in FIG. 2). As is well-known in the bender art, the direction of polarization of the respective ceramic members may be either the same or opposed, depending upon how the electrodes 49, 51 and the brass vane 47, which may also be used as an electrode, are energized.

For protective purposes, the leaf 41 is mounted in an open-end housing 59 composed of a base shoe member 61 and a cover member 63 having two side walls 65 fitting on shelves 67 of the shoe 61. The leaf 41 is solidly mounted between the two electrically insulating spacers 69 by means of a bolt 71, which passes through the cover 63, the leaf 41, both spacers 69, and is threaded into shoe 61. The bolt 71 is insulated from the leaf 41 by means of an electrically insulating collar 73 between the spacers 69. To provide access to the head 11 and leads 38, the cover 63 is made shorter than the shoe 61 and is cut away in an upper slot 75, the leads 38 having terminals 77 mounted on the upper inner end of cover 63. Because a low mass is desired for the leaf 41, damping may be necessary or desirable. In such event, to provide damping and thereby lower resonant frequency for the leaf 41, and to act as limit stops or restraints, the cover 63 and shoe 61 may be provided with so-called dead-rubber pads 79, 81, respectively, which absorb impact without immediate rebound (see also FIG. 4). These restraints serve to prevent undesirable movement of the supported head 11 that could introduce errors in the recording and/or reproduction of signals.

Leads 53, 55, 57 extend respectively from elements 49, 47, 51 for coupling a voltage source to establish an energizing electric field in the elements and may be formed as shown in FIG. 6, in which a corner of each inwardlyextending leaf end layers 49, 42 and 44 is cut away to leave a soldering shelf 83 for attaching the lead 55 to the brass rein electrode 47, while the leads 53 and 57 are soldered respectively to electrodes 49 and 51. However, this arrangement requires a certain extension 85 (FIG. 2) of the electrodes, and in fact of the leaf 41, radially inwardly of the spacers 69, away from the head 11. In order to prevent such extension 85 from responding to harmonic vibrations of the drum driving motor, and other external vibration sources, and thus upsetting the fine control of the movement of leaf element 41, the entire extension 85 is potted between the shoe 61 and cover 63 as illustrated in FIGS. 3 and 5, in which the non-conductive potting compound (e.g., epoxy) is represented by reference numeral 87. The cover 63 and shoe 61 may be cut away to define an enlarged potting chamber 89 for this purpose.

The assembled leaf element 41 and housing 59 are mounted on the drum 13 as shown in FIGS. 1 and 3. Drum 13 is provided with a cylindrical peripheral flange 91 and a central radial web 93. Because the drum 13 bears only one head 11 as in the 360° wrap configuration, the drum web 93 and part of the flange 91 are cut away to define an opening 95 to counterbalance the mass of the head 11 and its mounting means. A bracket 97 is mounted in bridging relation across the opening 95, as by means of bolts 99. The shoe 61 is mounted on the bridging bracket 97 as by means of a bolt 101, with the shoe 61 extending toward the peripheries of the drums 13 and 15 to leave nothing protruding beyond those peripheries but the tip of head 11 extending through the cut-away portion 103 of the flange 91.

For optimum performance, the dimensions and proportions of the leaf 41 are carefully selected for the particular application intended. The leaf material is available commercially and is obtainable in various standard thicknesses, which can be cut to desired length and width dimensions. The selection of dimensions and proportions is made according to the desired leaf element displacement sensitivity, range and response, desired resonant frequency, desired purity of leaf element motion, and desired structural rigidity so that the free end of the leaf element 41 (a) is permitted to move along a desired path that results in the controlled displacement of the suspended magnetic head 11 in a direction relative to tape 17 that moves the head's recording/reproducing gap 35 transverse to the time axis of signals recorded along the tape and (ii) is restrained against movement that would result in the gap 35 of the head 11 moving in any substantial or significant manner, particularly with a component in the direction of the time axis, that would introduce undesirable timing errors in the recording and/or reproduction of signals. While longitudinal displacement of the free end of the leaf occurs in the direction of the length dimension of the leaf as it is deflected transverse to the time axis, with the present invention, it does not have an effect on coupling signals between the tape and magnetic head, at least partly because, as will be described hereinbelow with respect to the present improvement invention, the energizing voltage is coupled to the leaf element in a manner to maintain the face of the head 11 parallel to the tape as the head 11 is deflected transverse to the time axis. This prevents inclination of the gap 35 relative to the tape 17 and separation of the face of the head 11 and tape 17 as the head 11 is transversely deflected.

Returning now to the embodiments of the basic apparatus, the structure includes a leaf element having a length dimension, L, of 2.4 cm., the free end of the leaf moves less than 0.0001 cm. for a typical deflection of ± 0.024 cm. In helical scan machines, the time axis of signals recorded along the tape 17 lies along the path scanned by the head 11 illustrated by line 23 in FIG. 8. More particularly, the leaf element 41 should have a length, L, (the suspended portion measured from spacers 69 to the free leaf end at head 11) to width, W, aspect ratio that restrains the element 41 against any movement in the width dimension or against any torsional movement about the length-width plane of the element 41 that would give rise to an undesirable displacement of the suspended head 11 having a component along the time axis or line 23. Undesirable displacements that are to be particularly avoided are those that would introduce unacceptable azimuth and time base errors in the recording and reproducing of signals. For signals in the color television video frequency range, displacement along the time axis or line 23 should be limited to less than 0.13 microns in order to avoid such errors. On the other hand, it is preferred that the length-to-width aspect ratio not be so small as to unduly limit the possible head displacement range for a practical drive voltage used to control the displacement of the element 41. For example, for a head displacement range of ± 0.025 cm., a length-to-width aspect ratio of 2 is the most suitable. As the aspect ratio is increased, the leaf element 41 becomes less rigid in the width dimension and, eventually, is able to move in a direction having a component along the time axis or line 23 causing unacceptable azimuth and time base errors. As the aspect ratio is decreased, the leaf element 41 does become more rigid in the width dimension. But, the drive voltage must be increased for a given head displacement, eventually to levels that become impractical, particularly, for the rates of displacement cycles necessary to maintain the error-free tracking that the present invention is intended to provide for helical scan applications.

The thickness, t, of the leaf element 41, is selected, in the preferred embodiment described herein, to provide good sensitivity, i.e., displacement per unit drive voltage, sufficiently high resonant frequency to permit the element 41 to be displaced at desired high rates below the resonant frequency, purity of leaf element motion and a practical voltage limit for the desired maximum displacement rate and range. For example, for a displacement rate of up to about 200 displacement cycles per second over a range of ± 0.025 cm., a thickness on the order of 3% of the width dimension of the element 41 is suitable. While leaf elements of smaller thicknesses are characterized by greater sensitivity, they also have a lower resonant frequency. As the rate of leaf displacement approaches a resonant frequency, the leaf displacement exhibits marked changes from displacements at frequencies either side of the resonant frequency. Such marked displacement changes make control of the position, hence tracking of the leaf element 41, exceedingly difficult. The opposite is the case for leaf elements of greater thickness, i.e., decreased sensitivity and higher resonant frequency. Further, thicker leaf elements require higher drive voltages for a desired displacement range and rate. Torsional displacements giving rise to unacceptable time base and azimuth errors are further restrained by constructing the leaf element 41 to experience a pure bending motion-type displacement when subjected to an energizing electric field. Such displacement is achieved by constructing the leaf element 41 to have a uniform thickness over its length. A thickness uniformity along the leaf's length of ± 10% of the thickness design value provides excellent restraint against unacceptable torsional displacements.

The positionable head mounting structure of the present apparatus is further characterized as being capable of a very low mass (1.5 grams is a typical example) construction. The low mass construction is possible because the structure utilizes a single thin leaf positionable element 41, from which is suspended a magnetic head 11 of relatively negligible mass. The low mass characteristic of the structure facilitates the rapid displacement of the head 11 under carefully controlled conditions whereby it can be precisely positioned to follow a desired path along the magnetic tape 17. Furthermore, it enables the positionable head mounting structure to be used in rotary scan record/reproduce machines, such as helical scan machines of the kind in current commercial use.

In one embodiment of the positionable head mounting structure used in a helical scan machine, the leaf element was constructed to have a thickness, $t$, of 0.05 cm., and an extension (or length, $L$) dimension of 2.4 cm. in order to provide a resonant frequency of about 400 deflection cycles per second. The width of the leaf element 41 was selected to be 1.27 cm., a value that provided adequate stiffness or rigidity in the direction of the scan of the head 11 over the tape 17 (or time axis of the signal recorded along the tape), considering the frictional drag created by the tape, and the repeated extremely large impulse change in the frictional forces acting on the head 11 as it enters and leaves each scan of the tape 17. Particularly to be avoided is an effect of twisting of the leaf about its longitudinal axis, which would cause skewing effect of the head with respect to the tape. The dimensions selected were found satisfactory to avoid skew.

From some applications, it may be desirable to mount a plurality of magnetic transducers on the positionable element. For example, FIG. 7 illustrates an application in which a pair of left-offset and right-offset track sensing magnetic heads 105 and 107 are employed to monitor continuously the position of a single record/reproduce magnetic head 11a relative to a recorded track and provide information that is used to control the position of the record/reproduce head. The construction and implementation of this embodiment for controlling the position of a single record/reproduce head is described more fully in my co-pending United States application, Ser. No. 668,571, filed Mar. 19, 1976 and entitled AUTOMATIC SCAN TRACKING. The single record/reproduce head 11a is mounted just as is head 11, while track sensing heads 105, 107 are mounted on either side of head 11a, but are oppositely staggered transversely to the direction of motion 21a, so as to sweep, respectively, left-offset and right-offset zones 111 and 113 that overlap the middle zone 115, which corresponds to the expected range of track displacement of head 11a. As shown in FIG. 7, record/reproduce head 11a is mounted directly on the surface of the leaf 41a for sweeping a range of displacements represented by middle zone 115. Left-offset track sensing head 105 is mounted on a spacer element 109 fastened to the surface of the leaf 41a, the thickness of the spacer 109 being less than the width of the head 11a so that the sensing head 105 is spaced above the head 11a by an amount less than the width of the head 11a. Right-offset track sensing head 107 is mounted on a recessed mounting shelf 117 provided by cutting away leaf 41a at the corner, somewhat as in FIG. 6. Mounting shelf 117 is recessed below the surface of leaf 41a a distance equal to the thickness of the spacer 109 so that the sensing head 107 is spaced below the head 11a by an amount less than the width of the head 11a. With the track sensing heads 105, 107 mounted in the aforedescribed manner relative to the record/reproduce head 11a, the paths scanned by the sensing heads always overlap the edges of the path scanned by head 11a as it is displaced through the expected range 115 of track displacement. In the event the path scanned by the head 11a is a recorded track of information, the sensing heads 105, 107 reproduce information from the overlapped edges of the recorded tracks as they follow the record/reproduce head 11a. Alternatively, the sensing heads 105, 107 may be made narrower in width (i.e., transverse to direction of motion 21a) than head 11a, so as to have less overlap upon the path scanned by head 11a, or even zero overlap. However, the heads 105, 107 preferably do not extend laterally beyond the dimension of the guard bands flanking the recorded track, when the head 11a is correctly following the track, and thus heads 105, 107 do not ordinarily read parts of adjacent tracks. With regard to other structural features of the transducer mounting structure of FIG. 7, such as, for example, a housing, head windings, electrical leads, and restrains, they may be constructed similarly as described with reference to the embodiment of FIGS. 1 through 6.

FIGS. 10A and 10B illustrate, in schematic block diagram form, embodiments of means for sensing the position of the record/reproduce head relative to a desired path along a record surface, such as a recorded track of information, and generating a suitable signal for actuating the positioning element by, for example, energizing the piezoelectric members, 42 and 43 for displacement to control the position of the head so that it follows the path or recorded track. The embodiment of FIG. 10A is for use with the magnetic transducer mounting structure embodiment illustrated by FIGS. 1 through 6 and utilizes a dithering technique, such as described in detail in the United States application by Raymond F. Ravizza, Ser. No. 669,047, filed Mar. 22, 1976, entitled AUTOMATIC SCAN TRACKING and assigned to the assignee of this application, to sense and control the position of the record/reproduce head 11. The embodiment of FIG. 10B is for use with the magnetic transducer mounting structure embodiment illustrated by FIG. 7 and utilizes a track following technique described in detail in my above-referenced United States application, Ser. No. 668,571 to sense and control the position of the record/reproduce head 11a. Considering first the position sense and control embodiment of FIG. 10A as employed with the mounting structure embodiment of FIGS. 1 through 6, an oscillator 151 is operated to provide at its output a fixed frequency alternating dither signal, which is coupled to the leaf element 41 causing it to vibrate within a displacement range. The frequency and size of the displacement range are selected in accordance with the considerations specified in the above-referenced Ser. No. 669,047 application. Before coupling to the leaf element 41, the dither signal is coupled to one input of a voltage summing circuit 152 to be algebraically summed with a voltage control signal provided by an adjustable bias voltage source 153 and coupled to a second input of the summing circuit. The resulting summed dither and control signal provided at the output of the summing circuit 152 is coupled by line 154 to be applied between the two leads 53 and 57 so that the summed signal is impressed across the entire leaf element structure. If the summed signal is to be applied to leaf element 41 with reference to the brass vein electrode 47, the other electrode 55 is required. One of the electrodes, for example, 51, connected to the lead 57 serves as a reference for the applied summed signal.

The dither signal component of the applied summed signal causes the leaf element 41 to vibrate over the selected range as the suspended head 11 is operated to reproduce signals along the track, such as represented by line 23. This vibration causes an amplitude modulation of the envelope of the reproduce signal. When head 11 is located in the proper track position at the center of the track 23, the amplitude modulation of the reproduced signal is at a minimum and increases to a maximum as the head 11 is displaced to one side or the other of the track center. Thus, minimum peak-to-peak values of the signal envelope occur when the head 11 passes through track center and greater peak-to-peak signal envelope values occur when the head 11 is displaced to one side or the other of the track center. With the head 11 in the proper track position, the frequency of the envelope variation is twice the frequency of the dither signal component. However, with the head 11 to either side of the proper track position, the maximum-to-minimum envelope amplitude variation occurs once for each cycle of the dither signal component, or at the dither signal frequency, with the order of occurrence of the maximum and minimum points depending upon the side of track center to which the head 11 is offset. Detection of the order of occurrence of the maximum and minimum points provides information definitive of the direction the head 11 is offset from the center of track 23 and detection of the envelope amplitude variation provides information definitive of the amount of offset.

To obtain this track offset information, leads 38 of the head 11 are coupled to the input of an envelope detector 156. The detector provides a signal representative of the amplitude modulated envelope component of reproduced signal at the frequency of the dither signal. This signal is coupled to a control input of synchronous detector 157 for phase and amplitude comparison with the dither signal provided by the oscillator 151 and coupled to a reference input of the detector 157. The detector 157 is responsive to the input signals to generate an output signal having an amplitude proportional to the amount head 11 is offset from track center and a polarity representing the direction of the offset. This output signal is provided to the input of the adjustable bias voltage source 153 to adjust the voltage level of the control signal in accordance with the amplitude and sense of the output signal. Source 153 is responsive to the output signal to generate a control signal whose voltage level follows the amplitude and sense variations of the output signal so that the positioning leaf element 41 is energized to compensate for detected track offsets of the head 11 upon application of the summed control signal and dither signal.

With reference to the track following embodiment of FIG. 10B as employed with the transducer mounting structure embodiment of FIG. 7, it includes an adjustable bias voltage source 161 that provides a control signal at its output, which is coupled by line 162 to leads 53a and 57a to be applied, as in the embodiment of FIG. 10A, across the entire leaf element structure 41a. Two inputs of a difference detector 163 are respectively coupled to receive the signals reproduced by the sensing heads 105, 107. The difference detector 163 compares the average amplitudes of the reproduced signal envelopes and provides an output difference signal whose amplitude is proportional to the difference in the average amplitudes and whose sense is representative of which of the average amplitudes is the largest. When head 11a is located in the proper track position at the center of the track 23, the average amplitudes of the signals reproduced by the sensing heads 105, 107 are equal. Thus, the output signal of the difference detector will be zero, or correspond to the desired track position for head 11a. However, as the head 11a is displaced from track center in the direction of the left-offset track sensing head 105 (see FIG. 7), the average amplitude of the signal envelope reproduced by the sensing head 105 proportionately decreases while that reproduced by the right-offset track sensing head 107 proportionately increases. The contrary occurs as the record/reproduce head 11a is displaced from track center in the direction of the right-offset track sensing head 107, i.e., the average amplitude of the signal envelope reproduced by the sensing head 107 proportionately decreases while that reproduced by the sensing 105 proportionately increases. The difference detector 163 is responsive to such proportionately changing signals to generate a difference signal whose amplitude follows the amplitude difference of the signal envelopes reproduced by the sensing heads 105, 107 and whose sense is dependent upon which of the signal envelopes has the greatest average amplitude. This difference signal is provided to an input of the adjustable bias voltage source 161, which is responsive to adjust the voltage level of the control signal in accordance with the amplitude and sense of the difference signals so that, upon its application to the positioning leaf element 41a, the element is energized to compensate for detected track offsets of the head 11a.

While the transducer mounting structure has been described particularly in relation to magnetic helical scan applications, it will be apparent that the positionable transducer mounting structure is equally well adapted for use with other signal recording systems employing transducers other than magnetic heads. Also, other types of record medium scanning apparatus may be used, such as transverse scan apparatus, magnetic discs and magnetic drums, and longitudinally recorded tapes. For transverse scan, the head, or an appropriate number of them, may be mounted in a similar manner on the scanning drum. In the magnetic drum and disc art, the mounting structure is well adapted to enable the head to follow apparent track irregularities that may be caused by wobble or run-out, such as may, in turn, be caused by eccentric or axially misaligned drums/discs or mis-alignment of the head moving mechanism. In longitudinal recording, the head mounting structure permits the head to follow apparent track irregularities such as may be caused by misalignment of the tape guides or head mounting base, or simply by wavy tape edges engaging well-aligned guides when the tape has shrunk or expanded after having been recorded. For parallel channel recording applications, more than one record/reproduce head can be supported from a single positioning element.

THE BASIC STRUCTURE INCORPORATING A SENSING STRIP

Referring now to FIG. 11, a scanning drum 220 of a helical videotape recorder is shown and has a rotable portion which carries a reproducing or "read" head which contacts and scans successive tracks on a magnetic videotape.

The scanning drum 220 has a pair of drum portions 222 and 224 around which a videotape 226 is wrapped. The tape 226 is caused to move by tape transport means (not shown) in the direction of the arrows A and wraps around the drum portions 222 and 224 in a helical path. The tape 226 is kept in tight contact and aligntment with the drums by guide rollers 228 and 230 and by tension exerted on the tape by the tape transport.

In a helical videotape recorder the information tracks run diagonally with respect to the lengthwise dimension of the tape, and a portion of one such track 232 whose size is exaggerated for clarity is shown in FIG. 11. In order to sense the information recorded on track 232 a read transducing head 234 is mounted on drum portion 222 which rotates in the direction of the arrow B. The movement of the tape 226 and the rotation of the transducer 234 causes transducer 234 to contact the tape along the track 232 and to generate an electrical signal representative of the information previously recorded on the track. This electrical signal is fed to signal processing circuitry for processing in a manner well known in the art.

It is apparent that the extent to which the transducer 234 can faithfully reproduce the information originally recorded on the track 232 depends on the transducer 234 accurately following or tracking the track 232. Because of the possibility of the aforedescribed tracking problems, it is desirable to sense the instantaneous position of transducer 234 with respect to track 232. Apparatus for sensing the position of a read transducer with respect to a track is disclosed in the above-referenced applications, Ser. No. 668,571 and Ser. No. 669,047. Briefly, when perfect tracking between the read transducer and the track is not occurring, an electrical correction signal is applied to a deflectable support arm such as a bimorph on which the read transducing head is mounted. The correction signal causes the support arm to deflect the transducer toward track center and thus reduces tracking errors.

Deflection of the read transducer is also desirable in helical videotape recorders, such as that described in my application Ser. No. 677,815, filed Apr. 16, 1976, entitled METHOD AND APPARATUS FOR PRODUCING SPECIAL MOTION EFFECTS IN VIDEO RECORDING AND REPRODUCING APPARATUS, wherein slow motion and other effects in a reproduced video scene are generated, the approximately half speed slow motion effect, for example, being produced by reducing the tape transport speed to one-half its normal speed and by causing the read transducer to reach each track twice. In order to read a track twice, the read transducer must be physically re-positioned or reset to the beginning of the track which is to be repeated. This reset of the read transducer is accomplished in one embodiment of the recorder disclosed in the above-noted application by applying an electrical reset signal to the deflectable support arm upon which the read transducer is mounted and thereby deflecting the support arm and the transducer so as to reset the transducer to the beginning of the desired track. The reset signal is in the form of an electrical impulse which may tend to cause the support arm to vibrate or oscillate, and such vibrations must be damped to assure correct alignment between the transducer and the tape.

Vibrations in the deflectable transducer support are are also induced when the transducer makes and loses contact with the tape. For example, in the scanning drum arrangement in FIG. 11, read transducer 234 experiences a dropout because it loses contact with tape 226 in the gap between guide rollers 228 and 230 during each rotation of the drum 220. Contact between the transducer 234 and the tape 226 is reestablished as transducer 234 passes roller 228 as it rotates in the direction of arrow B.

The vibrations set up in a deflectable transducer support arm are, of course, undesirable since they can produce a loss of tracking. This loss of tracking due to vibrations can be minimized or eliminated by sensing the vibrations in the deflectable support arm and applying a damping signal to the support arm to counteract the vibrations.

Thus, in helical videotape recorders in which it is desirable to include a deflectable support arm for reducing tracking errors, it is also desirable to include means for damping electrically and mechanically induced vibrations in the deflectable support arm. Preferably, damping the vibrations can be done electronically, in which case some means for sensing the amplitude of the vibrations and for generating an electrical signal indicative thereof, is required.

A deflectable read transducer assembly which includes means for sensing vibrations induced therein is shown in FIG. 12 and is indicated generally by reference numeral 236.

At one end of assembly 236 is the read transducer 234 itself. Its output is coupled via wires 238 to a pair of transducer output terminals 240 from which the transducer output is fed to a conventional video processing circuit (not shown).

A support arm, indicated generally at 242, for holding and deflecting transducer 234 is a piezoelectric bimorph which deflects or bends when a deflection potential is applied to it. The bimorph is formed from a number of layers bonded together to act as a piezoelectric motor 243 and includes a top piezo-ceramic element or layer 244 and a bottom piezo-ceramic element or layer 246. The various layers of transducer assembly 236 are shown more clearly in FIG. 12A. Piezo-ceramic elements 244 and 246 are both bonded to a common, electrically conductive substrate 248. Substrate 248 limits the movement of the bimorph to a bending motion in response to an applied electrical potential.

In order to impress an electrical potential to piezo-ceramic elements 244 and 246, conductive layers 250 and 252 cover the outer surfaces of elements 244 and 246. Terminals 254 and 256 (FIG. 12) are electrically connected to layers 250 and 252, respectively, for receiving an electrical deflection potential. Substrate 248 also has an input terminal 258 to serve as electrical common for the applied deflection potential. The electrical potential for deflecting support arm 242 is applied across piezo-ceramic element 244 between terminals 254 and 258 and across the piezo-ceramic element 246 between terminals 256 and 258.

In order to force support arm 242 to deflect at its free end 260 where transducer 234 is mounted, arm 242 is cantilevered between insulating spacers 264 which may be held in place by a bolt (not shown) passing through hole 266.

In operation, appropriate deflection potentials are applied across piezo-ceramic elements 244 and 246 via input terminals 254, 256 and 258. Support arm 242 then bends at its free end 260 and deflects transducer 234 in a direction and to an extent which is dependent on the magnitude and polarity of the potentials applied to terminals 254, 256 and 258.

In some applications, a piezoelectric motor need include only one piezo-ceramic element bonded to a substrate. For example, a single piezo-ceramic element could have a top surface covered by a conductive layer and a bottom surface bonded to a conductive substrate which forces the element to bend when an electric potential is applied between the substrate and conductive layer. However, where large amounts of deflection are required, such as in videotape transducers, a motor element comprising two piezo-ceramic elements 244 and 246, as shown in FIG. 12, is preferable.

In addition to having a piezoelectric motor 243 for deflecting transducer 234, the assembly 236 also includes a deflecting or vibration sensor in the form of a piezoelectric generator 268. The generator 268 includes, in the illustrated embodiment, an edge portion 270 of the piezo-ceramic element 244 whose bottom surface is bonded to substrate 248 as previously described. It should be appreciated, however, the generator 268 could be formed by a portion located in the center of the element 244. The generator has a separate conductive layer 272 overlying the element portions 270. The conductive layer 272 is isolated from conductive layer 250 by a dielectric gap 274 to electrically isolate the output of generator 268 from potential applied to the conductive layer 250.

The generator 268 is cantilevered at 76 and has an opposite, free deflectable end 278. Thus, whenever vibrations or deflections occur in the motor 243 due to electrical or mechanical impulses, a corresponding deflection or vibration of the free end 278 of generator element 268 occurs and produces, between the common substrate 248 and the conductive layer 272, an electrical signal indicative of the instantaneous degree of deflection of the motor 243 and of the transducer 234.

In the description of the piezoelectric motor and generator above, generator 268 was said to include a piezoceramic element portion 270 of the element 244 and the motor 243 includes the bulk of the piezo-ceramic element 244. As shown in FIGS. 12 and 12A, piezo-ceramic element portion 270 is preferably part of the unitary piezo-ceramic layer or element 244. However, it is not necesary that the portion 270 be part of a larger unitary piece. For example, gap 274 could be extended downwardly to cut through layer 244 and form a separate element 270. It has been found, however, that even with large amplitude deflection signals applied to the elements 244 and 246, these deflection signals are not substantially coupled to generator 268 when the element portion 270 is part of the larger unitary element 244. However, cutting the element down to the ground plane results in an increased isolation of the motor-to-generator and increases the element's tolerance-to-surface contamination.

Any vibration sensor which develops an electrical output indicative of vibrations in arm 242 should be responsive to vibrations over a frequency range extending from approximately 10 Hertz up to at least 400 Hertz, at which the illustrated bimorph support arm has a resonant frequency. The generator 268 of FIG. 12, by extending lengthwise along the support arm 242, does exhibit a good frequency response over the range desired. This response appears much better, particularly at low frequencies, than the frequency response of a generator which may extend transverse to the lengthwise dimension of the support arm 242.

The preferred dimensions for support arm 242 include a length L extending from free end 260 to the cantilevered point 276 of approximately 0.9 inch and a width, W, of approximately 0.5 inch. Each of the layers 244, 246 and 248 are preferably approximately 0.006 inch thick while conductive layers 250, 252 and 272 have thicknesses in the range of a few microns. The width of the conductive layer 272, as measured between the gap 274 and the nearest edge of the support arm 236, is preferably about 50 mils. The substrate 248 is preferably made of brass and the conductive layers 250, 252 and 272 are nickel depositions. The piezo-ceramic layers 244 and 246 are bonded to substrate 248 by a conductive epoxy adhesive or the like.

The read transducer assembly 236 may be enclosed in a housing, such as illustrated in FIG. 2, having top and bottom portions which hold assembly 236 between them. The entire housed assembly may be held together by a bolt passing through appropriate holes in a top portion of the housing, through hole 266 (FIG. 12), and through another hole in a bottom portion of the housing.

The piezoelectric motor-generator combination described above is a low cost, reliable device capable of being controllably deflected and for simultaneously generating an output signal representative of the controlled deflection or of vibration-induced deflection. It is particularly useful as part of a read transducer assembly for a videotape recorder and is illustrated schematically in connection with the videotape recorder systems described below.

The piezoelectric motor-generator combination described above which simultaneously deflects a read transducer and senses vibrations therein is used in an electronic feedback control system for damping vibrations in a videotape read transducer.

Transducer damping schemes using so-called dead rubber pads to absorb vibrations in a transducer limit the effective deflection range of the transducer. Pads mounted on the read head adjacent the transducer in a rotatable scanning drive, they are subjected to high G forces as the drum rotates. Under these conditions, it can be difficult to keep the pads properly situated on the drum. An improved damping system in which the above-described motor-generator combination can be used is shown schematically in FIG. 13. Before describing the improved damping system, however, a brief description of associated transducer circuitry will be given in order to clearly indicte how the damping system cooperates with the associated circuitry.

Referring now to FIG. 13, a read transducer 234 operates as described above to sense or read previously recorded information in videotape tracks. The transducer 234 is part of the read transducer assembly 236 such as that shown in FIG. 12 and has a deflectable support arm 242 for deflecting transducer 234 in response to deflection signals to correct the alignment of transducer 234 with a track or to reset transducer 234 to the beginning of a track, as in the slow motion mode of operation described above. The support arm 242 is cantilevered at point 276 and its opposite end portion which supports transducer 234 is free to deflect.

The electrical signal output of transducer 234 appears on conductor 282 which conducts this signal to conventional video processing circuitry 284 for generating, for example, a composite television signal for RF transmission.

The output of transducer 234 is also fed to a transducer position control circuit 286. The function of control circuit 286 has been described hereinabove with reference to FIGS. 1 through 6 and 10B and is described in further detail in the aforementioned application by Ravizza et al, Ser. No. 669,047. Briefly, the position control circuit 286 generates a "dither" signal of fixed frequency for application to the deflectable support arm 242 for deflecting or "dithering" transducer 234 back-and-forth across a track at a fixed rate. Since dithering causes the transducer 234 to move transversely relative to the track, the signal output of transducer 234 will be amplitude modulated. The amplitude modulated signal envelope contains information concerning the alignment between transducer 234 and the track being read and is detected to produce a correction signal for moving the transducer 234 toward the center of the track. This correction signal and the dither signal appear on conductor 288 and are ultimately applied to the deflectable support arm 242.

A transducer reset signal generator 290 develops an electrical signal for application to the deflectable support arm 242 for selectively resetting the transducer 34 to the beginning of a track when such is required. Circuitry for developing such reset signals is described and claimed in my aforementioned application, Ser. No. 677,815.

The reset signal from signal generator 290 and the dither correction signal from circuit 286 are both fed to a frequency compensator 292 which comprises an amplifier whose frequency response complements the undesired residual response variations of support arm 242 when electronic feedback control damping is applied to it as shown schematically in FIG. 13. Frequency compensator 292 augments the action of the electronic damping circuit in order to provide the desired uniform frequency response for the overall system. The area of augmentation is in the 300 to 400 Hz region where the electronic damping action does not completely remove the rise in frequency response of arm 242 at its first-order mechanical resonant frequency.

The frequency compensated deflection signals from compensator 292 are fed via conductor 294 to a summing amplifier 296 which sums the deflection signals with a transducer damping signal generated by the feedback loop described below. The output of the summing amplifier 296 is fed via conductor 298 to a drive amplifier 300 which amplifies its input and applies it to deflectable support arm 242 for controllably deflecting transducer 234 to the center of the track and maintaining proper transducer to track alignment.

The various deflection signals which are applied to the support arm 242, particularly signals generated by the reset generator 290, may set up unwanted vibrations in the arm 242. This is particularly true where the arm 242 is a bimorph since bimorphs exhibit resonance characteristics which tend to drive the bimorph into damped oscillation.

To damp such oscillations, a negative feedback loop is included in the system shown in FIG. 13 for developing an electrical damping signal and for applying the damping signal to support arm 242 to dampen its vibrations or oscillations. The required damping signal is derived, in general, from a signal generator which generates a deflection velocity signal representative of the instantaneous deflection velocity of the read transducer 234. In the embodiment illustrated in FIG. 13, said signal generator includes a sensor 302 integral to the support arm 242 for generating a signal representative of the instantaneous deflected position of the transducer 234 and a differentiator 304 for converting the transducer position signal to a transducer velocity signal. The sensor 302 is preferably a piezoelectric generator of the type shown in FIG. 12, which is integrally formed with the bimorph support arm.

The output of sensor 302 is fed to a high input impedance amplifier 306 which presents a very small load to the sensor 302. Since the sensor 302 is typically equivalent to a voltage source in series with a capacitance, any electrical load on sensor 302 must be small in order to effectively couple low frequency signals from the sensor 302.

The output of amplifier 306 is coupled through a summer 308, whose other input will be described below, and to the differentiator 304 which differentiates the transducer position signal from the sensor 302 and converts it to a signal representative of instantaneous transducer velocity.

The differentiator 304 is illustrated as having an amplitude versus frequency characteristic similar to that of a high pass filter and therefore introduces a phase lead to the signals it passes. The significance of the phase shift experienced by a signal traversing the feedback loop is explained immediately below in order to better appreciate the function of the remaining undescribed elements of the feedback loop.

Because the support arm 242 is preferably a piezoelectric bimorph, it exhibits the well known first order resonance and anti-resonance characteristics of piezoelectric crystals, as well as higher order resonance characteristics. FIG. 14A illustrates the combined frequency response of a bimorph motor-generator combination of the type shown in FIG. 12. This response is generated by applying a varying frequency, constant amplitude sine wave to the piezoelectric motor and measuring the resultant output of the piezoelectric generator. The results of such a measurement are shown in FIG. 14A which indicates a resonance point near 400 Hertz and an anti-resonance point, which has been found to vary from around 700 Hertz to about 1000 Hertz, depending on the particular bimorph being used. The maximum output of the motor-generator combination occurs at resonance and the minimum output occurs at very low frequencies and at antiresonance. High order resonance characteristics are now shown in FIG. 14A.

Since the output of the motor-generator combination is maximum at resonance, vibrations or oscillations will tend to occur at its resonant frequency when the bimorph is excited by an electrical or mechanical impulse. Therefore, to eliminate the possibility of such oscillations, the feedback loop is tailored to feed back to the bimorph damping signals which are 180° out of phase with respect to the signals which initially excited the bimorph into oscillation, thereby counteracting the tendency of the bimorph to oscillate.

To insure that the damping signals are of the correct phase, the phase response of the bimorph motor-generator combination must be taken into account. As indicated in FIG. 14B on the curve labeled "bimorph", signals near resonance (about 400 Hertz) experience a phase shift of about 90° in passing through the motor-generator combination, and high frequency signals experience a phase shift of 180°. In order to ensure that signals near resonance experience a net phase shift of 180° around the feedback loop, and since all signals in the loop will be phase shifted 180° by an inverting feedback amplifier prior to being applied to support arm 242, the signals near resonance must be phase compensated by 90° so that their net phase shift is zero at the input to the inverting feedback amplifier. This insures that the loop will not oscillate at the resonant frequency due to instability in the feedback system. Since signals having a frequency far from resonance have a very low amplitude, the loop gain of the feedback loop will always be less than unity for them so that the phase shift which they experience will not cause instability in the loop.

Returning to the feedback loop of FIG. 13, the transducer velocity signal developed by differentiator 304 is fed to a low pass filter 310 whose upper cutoff frequency is chosen to substantially attenuate signals attributable to second order and higher order resonance characteristics of the bimorph. Such signals generally have a frequency of over 2000 Hertz and are attenuated at least 20 decibels by the filter 310. The filter 310 contributes some phase lag to signals which it passes in addition to the initial phase lag of 90° due to the bimorph itself (as shown in FIG. 14B).

To compensate for the total phase lag experienced by signals near resonance, a phase lead network 312 follows filter 310 and shifts the phase of signals received from the filter 310 so that those signals having a frequency near resonance have net phase shift of zero degrees upon leaving the lead network 312. The curve labeled "with lead network" of FIG. 14B illustrates the effect of lead network 312. In practice, the differentiator 304 also adds some phase lead and thereby assists the lead network 312 in properly adjusting the phase of the signals near resonance.

The signals near resonance from lead network 312 have a phase of zero degrees with respect to the signals initially exciting the bimorph and are in condition to be applied to a negative feedback amplifier 314 which inverts the signals received from the lead network 312. The output of negative feedback amplifier 314 is the damping signal which is combined in the summer 296 with the transducer deflection signals from the conductor 294, amplified by the drive amplifier 300, and applied to the bimorph support arm 242 to damp vibrations therein. The feedback amplifier 314 has a variable amount of negative feedback for adjusting the gain of the feedback loop to accommodate differences among bimorphs.

The feedback loop illustrated in FIG. 13 also includes means for compensating for the difference antiresonance responses among bimorphs. A frequency response curve is shown by the solid line in FIG. 14A and a dashed line indicates the variable nature of the anti-resonance characteristic among various bimorphs. For example, at 700 Hertz the frequency response of one bimorph may be considerably less than that of another bimorph, as indicated by the difference between the solid line and the dashed line at the frequency of 700 Hertz. Referring to FIG. 14B, the phase response of the feedback system with the lead network is such that signals near 700 Hertz undergo a 180° phase shift. If signals having a 180° phase shift are applied to inverting feedback amplifier 314, they will ultimately be applied to a deflectable support arm 242 in phase with the original exciting deflection signals and may lead to oscillations at that frequency if their amplitude is large enough at frequencies corresponding to positive feedback conditions for the feedback loop. Bimorphs having a frequency response illustrated by the solid curve of FIG. 14A have a very small output at 700 Hertz so that the overall loop gain of the system for such signals will be low enough to avoid oscillations, irrespective of their phase response. However, bimorphs exhibiting greater gain at 700 Hertz, as illustrated by the dashed line, may induce instability into the system if not otherwise compensated for. The feedback system illustrated in FIG. 13 compensates for such differences between bimorphs by adding a portion of the exciting deflection signals to the output of the sensing device 302 so that signals normally experiencing a 180° phase shift between their application to bimorph 242 and their output at sensor 302 will be effectively nulled. Signals experiencing such a 180° phase shift are shown in FIG. 14B to be in the vicinity of anti-resonance. Therefore, signals near anti-resonance can be effectively nulled by coupling across the transducer assembly 236 a portion of the signal normally fed thereto.

Referring to FIG. 13, a means for feeding through a portion of the deflection signal and combining it with the position signal developed by the sensor 302 includes the potentiometer 316 and the summer 308. Deflection signals appearing at the output of the summer 296 are fed to both the drive amplifier 300 and the potentiometer 316, whereupon a portion of the deflection signals are fed via conductor 318 to summer 308. Summer 308 also receives, from amplifier 306, deflection position signals developed by sensor 302. Deflection signals which undergo a 180° phase shift in passing through the input to support arm 242 to the output of sensor 302 (i.e., frequencies near anti-resonance) are nulled in summer 308 so that the loop is stabilized for frequencies near anti-resonance. This operation effectively creates an artificial null near 700 Hertz so that, regardless of the bimorph being used in transducer assembly 236, it will appear to have an effective null near 700 Hertz so that the loop gain for signals near 700 Hertz will always be less than unity and the feedback loop will be stabilized for signals at those frequencies.

Circuitry for effecting the functions of the various blocks in FIG. 13 is illustrated in FIG. 15. Transducer deflection signals, including the dither signal and reset signals referred to above, are applied at terminal 320 to frequency compensator 292 which includes a pair of conventional amplifier 322 and 324. The frequency response of compensator 292 is shaped conventionally by the RC coupling around amplifier 322 and between amplifiers 322 and 324 to have an overall amplification which decreases with frequency in the 300 to 400 Hz region in order to compensate for the residual frequency-dependent variations in deflection sensitivity of support arm 242 after electronic damping has been applied.

The output of amplifier 324 is fed via conductor 294 to summing amplifier 296 which also receives, at its non-inverting input, an input from the feedback control loop. The output of summing amplifier 296 is applied to drive amplifier 300 via conductor 298.

The negative feedback loop begins at terminal 326 at which the output from sensor 302 appears. The signal from sensor 302 is applied to amplifier 306 which is a conventional, frequency compensated, feedback amplifier 328. The output of amplifier 328 is fed to the inverting terminal of summing amplifier 308 which also receives, at the same input, a portion of the transducer deflection signals for creating the artificial null at antiresonance as described above. Diodes 331 protect amplifier 328 from damaging high voltage transients due to accidental short circuits between sensor 302 and the input to support arm 242.

The output of summing amplifier 308 is then conducted to differentiator 304, comprising serially connected capacitor 329 and resistor 330.

The low pass filter 310 which receives the output of differentiator 304 is an active elliptical filter comprised of amplifiers 332 and 334, and indicated generally at 336.

The lead network 312 receives the output of the filter 310 and comprises a capacitor 336 serially coupled to resistor 338. The output of the lead network 312 is applied to the inverting input of a conventional feedback amplifier 314 whose feedback and therefore forward gain is varied by adjusting the variable resistor 340. The output of amplifier 314 is coupled to the non-inverting input of summing amplifier 296 and then applied to the drive amplifier 300 which, in turn, drives the deflectable support arm 242 for deflecting the transducer 234 in the manner previously described.

The damping system described above provides improved damping for deflectable videotape transducers without restricting their dynamic range. The feedback control loop, in combination with the motor-generator transducer assembly, provides a reliable and low cost vibration damper for videotape recorders and other applications where vibrations in a deflectable bimorph transducer assembly require damping.

From the foregoing, it should be understood how a read transducer can be controllably deflected and dampted to maintain alignment between itself and a track along a record medium. An improved bimorph transducer system, including a method of applying deflection signals to a deflectable bimorph to achieve maximum deflection sensitivity will now be described. Such an improved system is useful in the helical scan tape recorder apparatus already described and will be illustrated in that environment. It is understood, however, that the improved method of driving a deflectable bimorph disclosed below is also useful in other applications where it is desirable to achieve a large amount of bimorph deflection.

A bimorph which is used for bi-directional deflection consists generally of two layers of piezo-ceramic material bonded to opposite sides of a conductive substrate. One end of the bimorph is cantilevered and the opposite end is left free to deflect in response to a voltage applied to the bimorph.

The direction in which a bimorph deflects depends on the polarity of the voltage applied to it and the poling direction of the pair of piezo-ceramic elements. The poling direction of a piezo-ceramic element is established by being initially subjected to a unidirectional electric field which polarizes the element according to the direction of the field. The polarized piezo-ceramic element is then said to have a "poling direction" and thereafter exhibits unique mechanical properties when subjected to subsequently applied voltages.

A known method of causing a bimorph to deflect or bend is illustrated in FIG. 16 wherein a bimorph 342 includes piezo-ceramic elements 344 and 346 bonded to opposite sides of conductive substrate 348. Bimorph 342 is cantilevered at 350 while its opposite end 352 is free to deflect.

Piezo-ceramic elements 344 and 346 are each shown with an arrow to indicate their respective poling directions. When they are aligned as shown in FIG. 16 with their arrows pointing in the same direction, they are referred to herein as having a common poling direction.

The poling directions shown are obtained by applying a voltage across a piezo-ceramic element such that the more positive potential is at the tail of the arrow and the more negative potential is at the head of the arrow. For example, in FIG. 16, bimorph 342 is shown being deflected upwardly by a voltage source 354 connected between elements 344, 346 and substrate 348. The polarity of source 354 is such that it is applying a voltage to element 344 in the same direction as its original polarizing voltage, whereas source 354 is applying a voltage to element 346 of a polarity opposed to its original polarizing voltage. When the polarity of a deflection voltage applied to a piezo-ceramic element is identical to the polarity of that element's original polarizing voltage, the applied deflection voltage is referred to herein as being applied in the poling direction. Thus, source 354 is applied to element 344 in its poling direction and is applied to element 346 in a polarity opposed to its poling direction.

When pairs of piezo-ceramic elements are aligned and cantilevered as indicated in FIG. 16, the bimorph will bend in the direction of the element which is being driven in its poling direction. Thus, bimorph 342 bends upwardly toward element 344 when driven by source 354 with the indicated polarity. When no voltage is applied to the bimorph, there is no deflection. When a source 356 is connected between substrate 348 and elements 344 and 346 as shown in FIG. 16, element 346 is driven in its poling direction and bimorph 342 deflects downwardly as indicated.

For some applications, the method of driving a bimorph illustrated in FIG. 16, wherein a deflection voltage is applied in the poling direction of one piezo-ceramic element and opposite to the poling direction of a second piezo-ceramic element is satisfactory. However, where a large amount of deflection is required, large deflection voltages are also required. It has been found that applying large voltages in a direction opposed to the poling direction of a piezo-ceramic element tends to depolarize that element and reduce its ability to bend or deflect.

Figure 17:
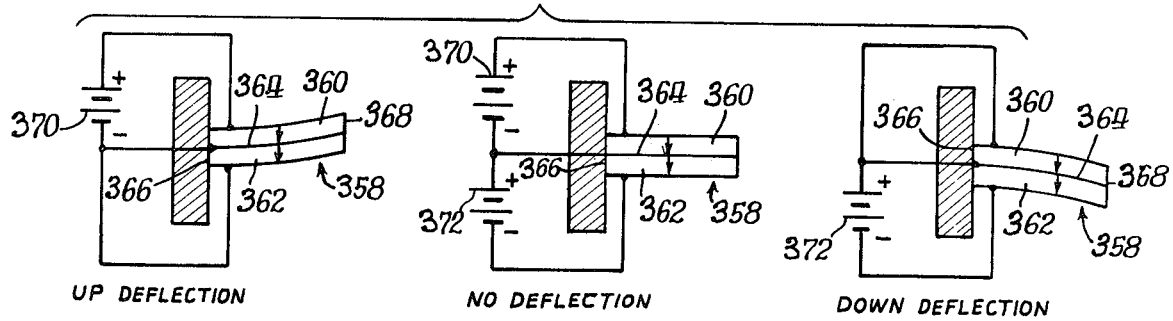
FIG. 17 illustrates an improved method of deflecting a bimorph.

A method of driving a bimorph with large amplitude deflection voltages without depolarizing either piezo-ceramic element is illustrated in FIG. 17. In the improved method, a bimorph 358 has a pair of electrically poled piezo-ceramic elements 360 and 362 which are also aligned in a common poling direction and bonded to a common substrate 364 between them. The bimorph 358 is cantilevered at one end 366 and is free to deflect at opposed end 368. In this improved method of deflecting a bimorph, deflection voltages are applied to the piezo-ceramic elements such that the polarity of the applied voltage is always in the poling direction of the applied voltage is always in the poling direction of the element to which it is applied so that a large degree of deflection of the bimorph can be effected without depolarizing either of the piezo-ceramic elements.

As shown in FIG. 17, when bimorph 358 is to be deflected upwardly, a voltage source 370 is connected between the piezo-ceramic element 360 and the substrate 364 such that the polarity of the applied voltage is in the poling direction of element 360. No opposed polarity voltage is applied to the element 362 since most of the bending of a bimorph is effected by the element which is driven in its poling direction.

When the bimorph 358 is to be deflected downwardly, a voltage source 372 is connected between the element 362 and the substrate 364 such that the polarity of the applied voltage is in the poling direction of the element 362. No opposed polarity voltage is applied to the element 360.

When bimorph 358 is to remain undeflected, sources 370 and 372 of equal magnitudes are applied between the elements 360 and 362 and the substrate 364 so that both piezo-ceramic elements 360 and 362 are driven in their poling directions. The net result of driving both elements equally is that no deflection takes place.

Although the sources 370 and 372 are depicted as being constant amplitude voltage sources, they need not be. If the bimorph 358 is to be deflected upwardly and downwardly with variable amounts of deflection, sources 370 and 372 could be made variable to accomplish such movement. However, the polarity of the voltages applied to elements 360 and 362 should always be in the poling direction of the element to which the voltage is applied.

Figure 18A:
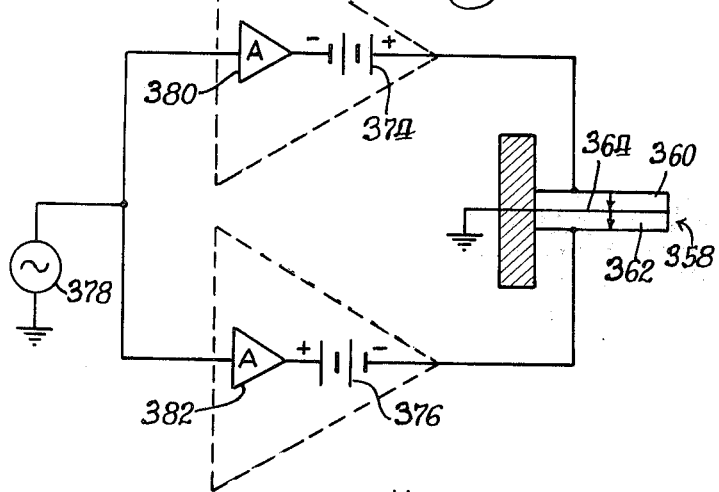
FIG. 18A shows a system for driving a bimorph.

A method of varying the magnitude and frequency of the deflection of bimorph 358 is illustrated schematically in FIG. 18A. As shown therein, a DC voltage from a source 374 is applied to the element 360 in its poling direction. The element 362 receives a DC voltage from source 376 which is in its poling direction. Preferably, sources 374 and 376 generate positive and negative DC voltages respectively, of magnitudes equal to $\frac{1}{2} V_{max}$, where $V_{max}$ is the peak to peak amplitude of the largest deflection signal which will be applied to the elements 360 and 362. Elements 360 and 362 are thus oppositely "biased" to $\frac{1}{2} V_{max}$ and, in the absence of any other deflection voltages, no deflection of bimorph 358 will occur.

For effecting alternating deflection of bimorph 358, an AC deflection source 378 is coupled between elements 360, 362 and substrate 364 through a pair of amplifiers 380 and 382 and DC sources 374 and 376. The peak-to-peak magnitude of the AC deflection signal applied in phase to elements 360 and 362 may now be as large as $V_{max}$ without ever applying to either element a net voltage which is opposed to its poling direction.

Figure 18B:
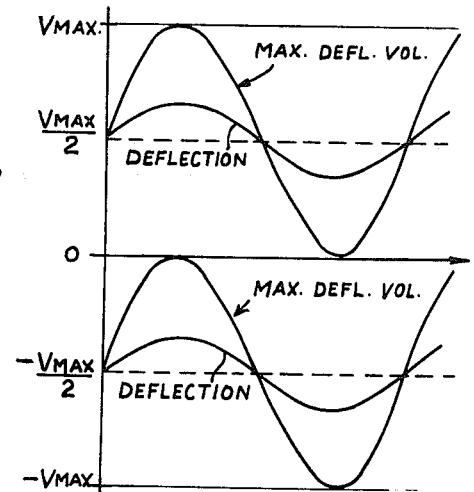
FIG. 18B graphically illustrates the net voltage which is applied to one element of the bimorph shown in FIG. 18A.

When the deflection signal from the source 378 varies generally sinusoidally, the net voltage which appears across element 360 is indicated in FIG. 18B. With the elements 360 and 362 oppositely biased at $\frac{1}{2} V_{max}$ and the superimposed AC deflection signal applied in phase to the elements, the net voltage cross each of the elements 360 and 362 always has a polarity which is in the poling direction of elements. The curves labeled "deflection" in FIGS. 18B and 18C indicate that bimorph 358 deflects in accordance with the two times the instantaneous amplitude of the AC deflection voltage provided by source 378.

When the net voltage on element 360 becomes more (or less) positive above $\frac{1}{2} V_{max}$, the net amplitude of the voltage on element 362 becomes less (or more) negative correspondingly. However, because of the bias provided by source 376, the net voltage on the element 362 will always be in its poling direction as long as the magnitude of the AC deflection voltage does not exceed $V_{max}$.

Figure 19:
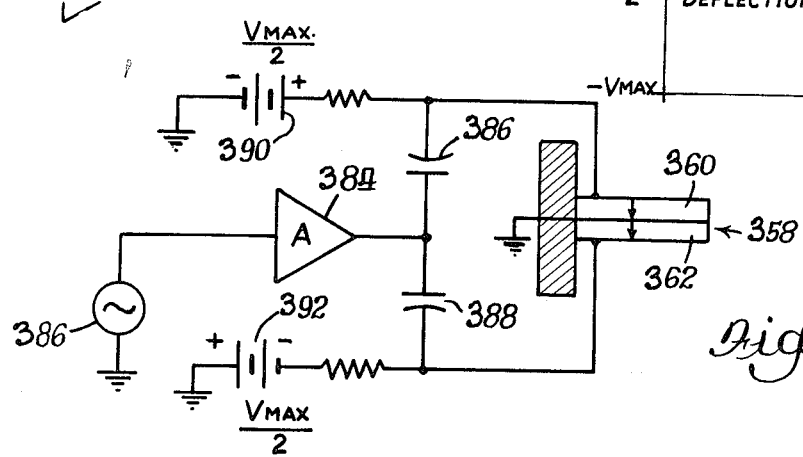
FIG. 19 shows an improved method of driving a bimorph when the bimorph deflection signal does not include very low frequency or DC components.

The system shown in FIG. 18A for driving the bimorph 358 is completely DC coupled so that bimorph 358 can be driven at very low frequencies by the source 378. In applications where low frequency bimorph deflection is not required, a system such as that shown in FIG. 19 may be used. In the system of FIG. 19, only one amplifier 384 is needed for amplifying the AC deflection voltage from source 386. The amplified deflection voltage is applied to elements 360 and 362 via coupling capacitors 386 and 388, respectively. Separate DC bias voltage sources 390 and 392, each having an amplitude of $\frac{1}{2} V_{max}$, bias the elements 360 and 362 so that the next voltage on either element will be in its poling direction.

Figure 20:
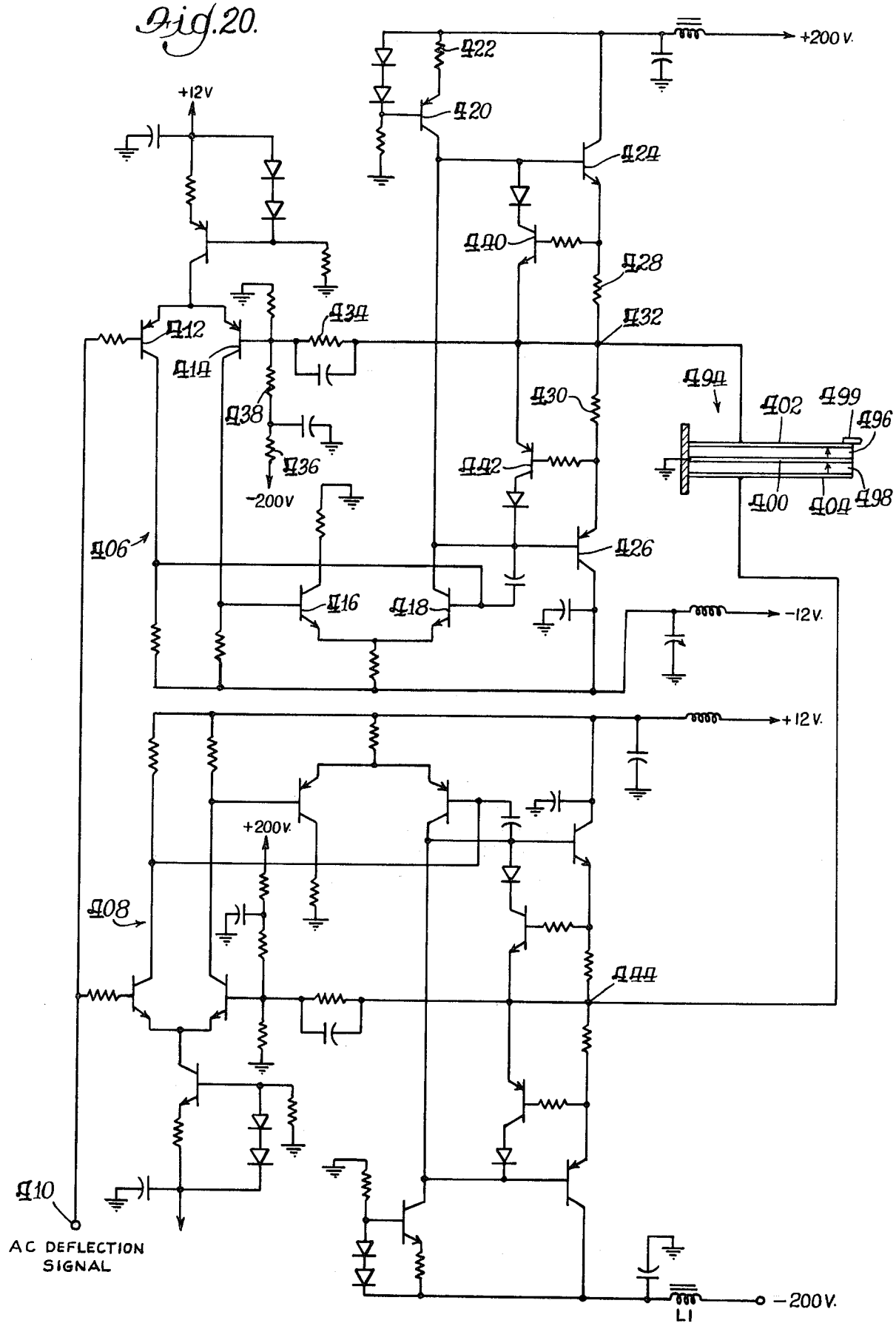
FIG. 20 is a schematic diagram of a deflectable read transducer system embodying the improved bimorph deflection method illustrated in FIG. 18A.

Referring again to FIG. 18A, the DC source 374 and amplifier 380 are enclosed in a dashed triangle to indicate that, in practice, they may be embodied together in one composite amplifier which amplifies the deflection signal and also provides the proper bias. Similarly, sources 376 and 382 may also be combined in a single composite amplifier. An example of a pair of composite amplifiers for driving a bimorph is shown in FIG. 20. The bimorph which is being driven in FIG. 20 is part of a read transducer assembly 394 for use with the videotape apparatus shown in FIG. 13. Transducer assembly 394 is shown schematically and in simplified form in FIG. 20 but is preferably similar to transducer assembly 236 shown in FIG. 12. (The piezo-ceramic generator 268 is not shown as part of transducer assembly 394 only in order to simplify the drawing.)

The transducer assembly 394 has a top piezo-ceramic layer 396 and a bottom piezo-ceramic layer 398 bonded to a common substrate 400 which is grounded. Deflection signals are applied to the transducer assembly 394 at upper and lower conductive layers 402 and 404. Piezo-ceramic elements 396 and 398 are poled in a common direction as indicated by the arrows.

A read transducer 399 is mounted on assembly 394 and is to be deflected in accordance with the principles and apparatus hereinbefore described. The piezo-ceramic layer 396 is driven by composite amplifier 406 and piezo-ceramic layer 398 is driven by the composite amplifier 408. The amplifiers 406 and 408 receive low level AC deflection signals at input terminal 410, amplify the deflection signals, and apply them superimposed on a DC bias voltage, to conductive layers 402 and 404. Generally, amplifier 406 includes a first stage of amplification provided by differential transistor pair 412 and 414 and a second stage of amplification provided by differential transistor pair 416 and 418. The output of transistor 418 is taken across constant current source transistor 420. The amplified signal at the collector of transistor 418 is applied to the bases of emitter followers 424 and 426 and through emitter resistors 428 and 430 to an output terminal 432. The signal at terminal 432 is fed back to the base of transistor 414 via a feedback resistor 434 so that amplifier 406 operates as a conventional operational amplifier with negative feedback.

The DC bias appearing at output terminal 432 is typically +100 volts and is determined by resistors 436, 438, the feedback resistor 434 and the +200 volt power supply. An AC deflection signal of 200 volts peak-to-peak can appear at the output terminal 432 without opposing the polarization polarity of piezo-ceramic layer 396. The transistors 440 and 442 provide short circuit protection for emitter followers 424 and 426, respectively, in order to limit their output current in the event that terminal 432 becomes inadvertently grounded. Amplifier 408 is similar to amplifier 406 and provides an amplified deflection signal at its output terminal 444 superimposed on a DC bias of −100 volts. Amplifiers 406 and 408 can be used together to provide the amplification performed by drive amplifier 300 in FIG. 13.

The composite amplifiers 406 and 408 provide large amplitude AC deflection signals superimposed on a DC bias voltage for driving the deflectable bimorph without depolarizing it and thereby ensure that the driven bimorph does not lose its deflection sensitivity. The transducer system shown in FIG. 20 and the methods illustrated in FIGS. 18A and 19 and described herein provide improved performance for deflectable bimorphs.

From the foregoing, it should be appreciated that various improved bimorph devices and methods have been described in the environment of an improved videotape read system. The bimorph motor-generator combination, for example, provides a compact, reliable device for sensing the instantaneous deflected position of a deflectable piezo-ceramic support arm. The illustrated embodiment of this device shows it as part of an improved videotape read assembly for generating an output signal indicative of the deflected position of a read transducer. This assembly overcomes problems associated with deflectable read assemblies which vibrate when they receive an electrical or mechanical impulse by generating an output signal which can be converted to a damping signal for damping the transducer vibrations.

The damping of transducer vibrations is achieved by the described feedback control system which generates a signal indicative of the velocity of a deflected or vibrating transducer, converts the velocity signal to a damping signal, and applies the damping signal to the transducer support arm to dampen vibrations therein. The improved bimorph motorgenerator combination is preferably used in this damping system to generate a signal indicative of instantaneous transducer position, the transducer velocity signal being derived by differentiating the transducer position signal. Various means are included in the damping system for stabilizing the feedback control system at frequencies near the resonant and anti-resonant points of the bimorph-motor-generator. This feedback control system, in combination with the bimorph-motor-generator transducer assembly, provides effective damping of a deflectable videotape read transducer without restricting the dynamic range of the transducer. Moreover, this electronic damping system is not adversely affected by the high G accelerations normally encountered in videotape read systems.

The damping signals and transducer deflection signals are preferably applied to the bimorph transducer support arm by ensuring that the applied deflection signals are always in the poling direction of the piezoceramic element to which they are applied to thereby overcome the depolarizing effects. A composite amplifier embodying this improved method receives large amplitude transducer deflection signals and applies them to the bimorph so as to achieve large bidirectional bimorph deflection without depolarizing the bimorph, thereby maintaining high bimorph deflection sensitivity.

DESCRIPTION OF THE PREFERRED EMBODIMENTS

As will be seen from the above, a programmable video head exists wherein a transducer is cantilever-mounted on a bimorph element, which when subjected to various voltages moves through an arc thereby displacing the head through a usable range. When displacing the head, this basic arrangement creates a "zenith" error, which is an inclination of the transducing gap to the record medium surface in the plane of the width and depth dimensions of the gap. This inclination introduces an increasing partial separation between the gap and recording medium in the plane of the gap's width and depth dimensions, which partial separation can result in signal loss because of reduced signal coupling between the head and record medium in the direction of the increasing separation. Such signal losses become significant and can seriously degrade the record/reproduce system performance at high signal frequencies, such as encountered when employing the well-known frequency modulation techniques in recording television signals. When the separation approaches the actual wavelength of the recorded and reproduced signal, the signal degrades rapidly as a function of the expression 55 $d/\lambda$ in dB wherein $d$ = separation spacing in $\mu$-in. and $\lambda$ = signal wavelength. In NTSC systems, the signal losses may be significant, but are usually not intolerable. However, in PAL systems, the record/reproduce writing speed is usually reduced to 5/6 of the NTSC writing speed and the nominal carrier frequency of the FM television signal tends to be higher than that employed for NTSC signals. Because of the reduced writing speed and higher nominal carrier frequency, the effective wavelength of the signal as recorded on the record medium is much shorter in PAL systems and the signal losses become objectionable. While the signal loss effect can be compensated to some extent during recording by increasing record drive provided to the head, this compensation will not eliminate the signal loss effect when displacing the head during reproduction. Upon reproduction the signal losses are manifested in the form of amplitude decay of the reproduced RF envelope. Such decay becomes objectionable when the signal-to-noise ratio is reduced below the level required for the desired system performance. In NTSC professional television signal recording applications, a signal-to-noise ratio of at least 46 dB peak-to-peak video to RMS noise is sought.

The aforedescribed gap to record medium zenith error is present in both rigid record medium systems, such as disc recorders, and flexible record medium systems, such as tape recorders. While one would expect that thin webs of magnetic tape, such as used in helical scan recorders, would conform to the contour of the magnetic head when the head is displaced the small amounts as hereinbefore described, in practice this is found not to be the case. Instead, as the head is transversely displaced in helical scan recorders, the trailing edge of the head relative to the direction of displacement remains in contact with the tape but the leading edge comes out of contact with the tape resulting in the aforedescribed adverse separation.

The problem, thus, is that because of the inclination of the head to the record medium, a portion of the record medium is not in contact with the head. A separation then occurs which may result in a seriously degraded signal.

Ideally, the relationship of the contronting faces of the transducer and the record medium should not change as the transducer is displaced perpendicular to the direction of relative transducer-to-record medium movement. If this relationship is achieved, the aforedescribed separation loss is minimized. This ideal can be approached by a modification to the bimorph. The proposed modification retains the stiffness advantage of utilizing a bimorph with the proportions selected for the most stable mounting. The RF envelope, which is a gage of the quality of the head-to-tape, is also enhanced.

Figure 26A:
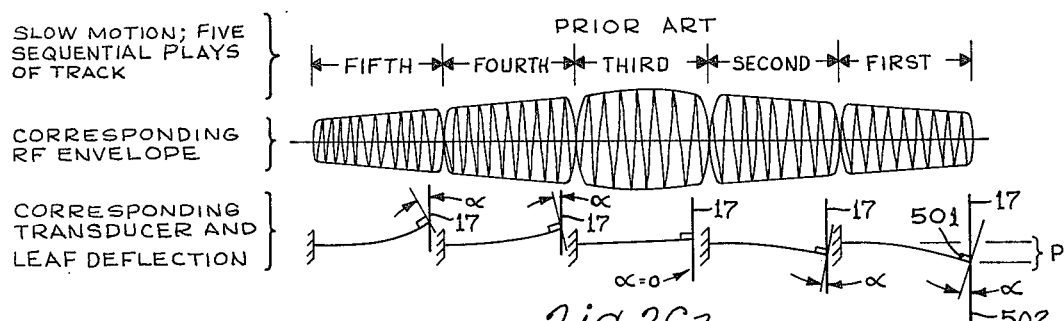
FIG. 26A is a schematic development illustrating operation of the basic structure upon which the present invention improves.

In the helical scan apparatus described above, certain signal degradation may occur when operating the apparatus to produce special motion effects, especially, 1/5 speed slow-motion and stop-motion. In 1/5 speed play, this degradation is due to the fact that the head must play back the same track five times. As shown in FIG. 26A, the first play of the track is started when the bimorph has deflected approximately one full track pitch P (which is 0.0087 in. in the NTSC system and 0.0102 in. in the PAL system). The inclination $\alpha$ of the head 501 to the tape 502 at the start of this scan is the greatest (e.g., 1.2°) and accordingly the separation loss is worst. Only a portion of the recorded track is picked up by the head transducer 502, as shown by the corresponding RF envelope 503. The second time the head 502 plays the track, it is closer to the center or nominal position and inclination, and the head-to-tape contact and signal envelope 504 improves. The third time the track is played the head 502 is in the nominal center position and nearly full contact is achieved. The fourth time the track is played, the head 502 again deviates from its nominal position and inclination and the signal envelope 506 is degraded to be approximately equivalent to the envelope 504 for second time play. The fifth time the track is played the head 502 is again inclined to the tape as in first play, but in the opposite direction, resulting in maximum signal degradation, as shown by envelope 507.

Considering that at 1/5 speed an integration of all five of these aforementioned events occurs, the resulting slow motion picture, depending on the recording carrier frequency and writing speed speed selected, can be acceptable on the whole, but to the trained observer is less than ideal. In the basic apparatus, stop-motion (the continuous playback of the same track) is random, such that any of the five positions can be selected as the still frame position. If the first or fifth position is selected (and this is a random event), a considerably degraded still frame picture can occur, again depending on the carrier frequency and writing speed selected for the system. In the basic apparatus these events do not seriously hamper the video quality of an NTSC signal. However, in a PAL version in which the writing speed is reduced and the carrier frequency is increased, the effective wavelengths of the signal recorded on the medium are reduced by 24%. In addition, the track-to-track spacing is 0.0102 in. as compared to the NTSC 0.0087 in. This means that the head must deflect even further, creating even greater zenith errors and resulting separation losses.

A solution to the above problem lies in the creation of a complex motion bimorph wherein the actual element bends in two directions within its length. In one embodiment, this result is accomplished by judiciously removing a portion of the bimorph electrode on both sides of the element, as shown in FIGS. 21A, 21B and 21C, which in effect creates two bimorph elements 508 and 509 within a singular structure. The ideal solution involves cutting the electrode in the middle of the cantilevered span, as shown in FIG. 21A leaving gaps 510 and essentially creating two equal size bimorphs 508, 509. The top or positive electrode 511 of the inner element 508 is then wired to the bottom electrode 512 of the outer element 509, as by means of wire 513. The other pair of electrodes 514, 515 are similarly cross-wired as by means of wire 516. To avoid depolarization effects, the entire system is polarized, when wired as shown, the outer bimorph element 509 being reverse-polarized with respect to the inner element 508, as shown in FIGS. 21B and 23. The reverse-polarization can be effected after the bimorph element is wired by the application of a high DC voltage to the cross-wired element. Alternatively, reverse-polarization can be effected before cross-wiring by the application of the high DC voltage separately with the polarity reversed to the inner and outer elements 508 and 509. In the embodiment described, 500 volts will bring about the desired reverse-polarization. Applying the driving potential across the inner bimorph as by means of terminals 254, 256 and 258 then establishes an "S" deflection of the total element, as shown in FIG. 23, instead of the typical simple cantilevered bend as in FIG. 16. Once the bimorph element is reverse-polarized and cross-wired as described above, driving potentials as provided by the circuits described above will result in the "S" deflection that maintains the confronting faces of the transducer and tape record medium essentially unchanged for degrees of deflection of the bimorph element.

Figure 26B:
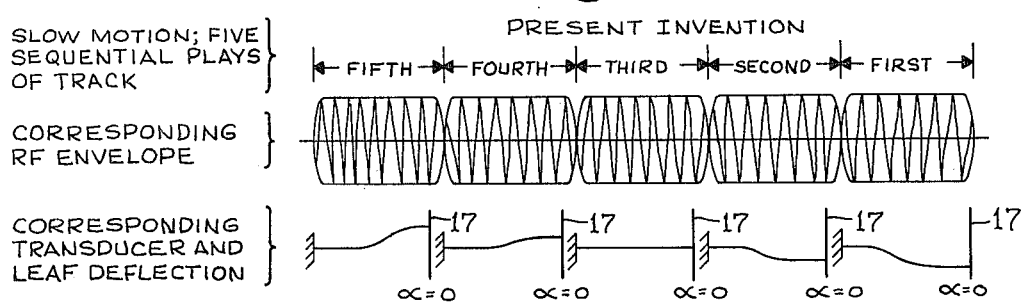
FIG. 26B is a schematic development illustrating the improved operation of the present invention.

In FIGS. 22 and 23, the thickness dimensions are exaggerated for the sake of clarity of illustration as in FIGS. 16 and 17; and the directions of polarization are shown by means of transverse arrows, while the induced stress and strain directions are shown by means of arrow-pairs generally aligned with the length dimension of the bimorph, with confronting arrowheads representing compression or shrinking effects and oppositely diverging arrowheads representing expansion effects. Analyzing the shape of the "S", it can be seen that the tip of the outer element (including the head 234) is now oriented undeviatingly parallel to its original plane, no matter how far it may be deflected laterally. Reversing the potential, an inverted "S" occurs, but the parallelism and orientation of the outer element tip and head 234 is maintained unchanged. As a matter of fact, anywhere between these two extremities, the parallelism is always maintained. Mounting the transducer 234 on the tip of this multi-element bimorph provides a uniform normal or perpendicular relationship between the transducer itself and the tape, thereby eliminating any significant inclination and preventing separation losses. FIG. 26B shows the result obtained with this structure, wherein at all positions of the head the signal envelope is rectangular in outline and of constant amplitude.

It should be recognized, however, that total potential deflection of the bimorph in its original singular form is reduced considerably by cutting the electrode at half span. However, since separation losses are logarithmic relative to inclination, a compromise can be struck between the amount of inclination that can be accepted and the amount of deflection that is needed. In the present apparatus, this compromise is achieved when the cut is ⅔ of the cantilevered length from the mounting point, as shown in FIG. 21C. Also, various methods can be used in cross-connecting the electrode plates. Wires coming over the side edge of the bimorph form one solution, as shown in FIG. 21A. Another solution is shown in FIG. 21C, in which the wires comes through a center hole 521 in the element. What is important is to minimize the mass that is added to the element, thereby preserving its resonant frequency characteristics so that the circuits used in the servo operation of the device do not have to be modified from those used with a bimorph element that is not cut to provide "S"-shaped deflection.

It will be noted that FIG. 22 illustrates the driving potential applied to the inner bimorph element 508 as in the "prior art" arrangement of FIG. 16, while FIG. 22 illustrates the inner element 508 driven as in FIGS. 16–20. However, only the outer element 509 of FIG. 23 is cross-wired with respect to the inner element 508; while in FIG. 22 the two upper inner and outer electrodes 511 and 515 are coupled in parallel, as are the two lower electrodes 514 and 512. In effect, the electrode pairs 511, 515 and 514, 512 are electrically driven just as if they were unitary and as if the cuts 510 did not exist, and when the upper portion of each bimorph element is in compression, the lower portion is expanding to produce the desired curvature, as illustrated by the longitudinally directed arrow-pairs. The S-bend effect of the invention is still produced because of the reverse polarization of inner and outer elements 508 and 509, as illustrated by the transverse arrows. The elements 508, 509 of FIG. 22 could just as well be cross-coupled as in FIG. 23. Conversely, the elements 508, 509 of FIG. 23 could be parallel-coupled as in FIG. 22 and the desired S-deflection would be achieved, at least initially, with the upper portion of each bimorph element being unstressed while the lower portion is either in compression or in expansion (or vice-versa), as shown by the longitudinally directed arrow-pairs. Under certain conditions, the parallel coupling illustrated by FIG. 22 may be useful, although the cross-coupled arrangement illustrated by FIG. 23 is preferred for use in the present invention for the reason that the driving current flow is in the same direction as was the initial (stronger) polarizing current, and thus tends to reinforce the polarization effect. In the parallel arrangement of FIG. 22, the driving current is directed oppositely to the direction of the original polarizing current, and thus may tend to gradually de-polarize the bimorph elements during operation. Considering, then, the variations suggested by FIGS. 22 and 23, it becomes possible to define the essential features of the invention:

First of all, the structure must provide for at least two reversely deflectable portions such as portions 508 and 509, preferably operable to maintain the head 234 in substantially undeviating orientation with respect to the record medium 17, combined with traversing motion in directions lateral to the track 23. (It is possible to arrange three or more portions having individual reversible directions of curvature, and to individually program the drivers therefor, in such a way as to ensure not only undeviating normal or perpendicular orientation of the head with respect to the recording surface, but also a strictly rectilinear lateral motion of the head in its sweep across the record track; but the achievement of such precision is not always required, and will not be further discussed herein.)

Second, when the structure includes two piezoelectric elements, the driving current must be applied to the electrodes in such a way, with respect to the polarizing direction of the element, that the two elements are deflected, if at all, in opposite curvilinear directions. In broad terms, it is not essential in all cases to have a gap 510 separating the electrodes as long as the piezoelectric element has adjacent reversely polarized portions and the depoling tendency can be tolerated. For example, adjacent portions of a piezoelectric member can first be reversely polarized, and then common, continuous electrodes can be placed on the opposite sides of the reversely polarized members to form the piezoelectric element having the reversely deflectable portions. In addition, it is not essential in all cases to provide reversely polarized portions in the piezoelectric element, providing that the driving current is directed oppositely to adjacent portions of the piezoelectric element and the depolarizing effects of the driving current flowing oppositely to the polarizing current direction in portions of the piezoelectric member can be tolerated. However, if depolarizing tendencies are to be eliminated, it appears that at least some portions of the piezoelectric structure must be polarized in opposite directions in order to ensure reverse deflections of the elements when driving current is applied in the poling direction; and gaps such as gaps 510 are advantageous whenever adjacent electrodes are to be driven by oppositely flowing current.

With these criteria in mind, many variations of structure are possible, including structures including piezoelectric members such as members 244 and 246, each of which is polarized uniformly throughout its length but oppositely in the poling direction of the other member; or structures employing only one piezoelectric member such as member 244 affixed to a bendable but non-elongatable member occupying the position, e.g., of member 248 with respect to member 244.

Figure 24:
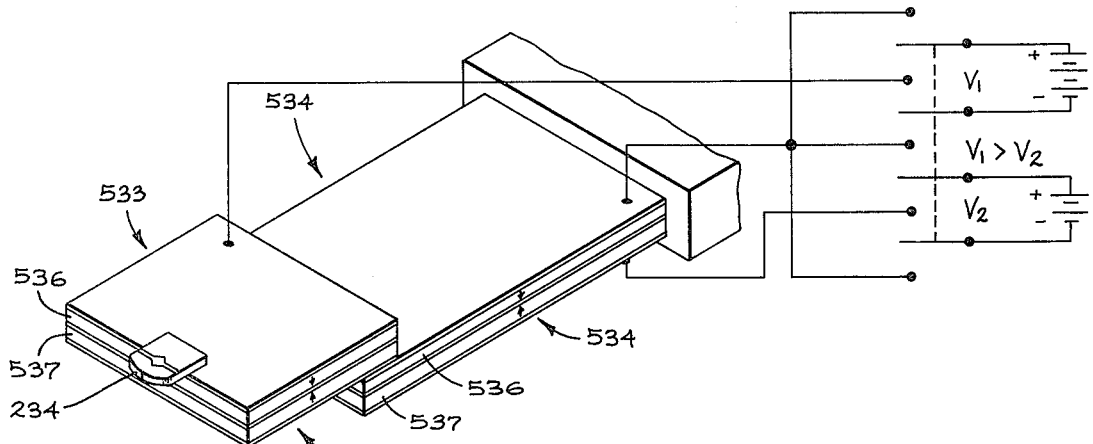
FIG. 24 is a perspective view, partly schematic, illustrating another variational form of the inventive structure.
Figure 28:
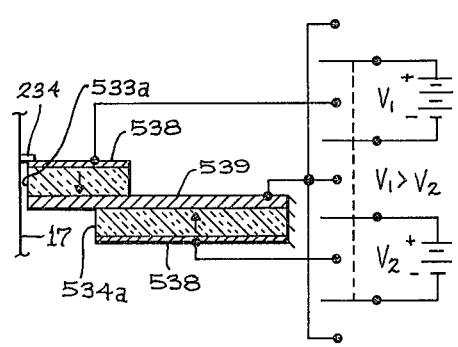
FIG. 28 is a schematic elevational view illustrating a further variational form of the invention.

Another approach to the problem is to partially laminate two individual piezoelectric elements 533, 534 as shown in FIG. 24, and independently apply voltage to each. In this example, both elements 533, 534 are each composed of two piezoelectric members 536, 537 that are oppositely polarized, in this case toward one another as shown by the transverse arrows, and are series connected to independent voltage sources $V_1$ and $V_2$. Alternatively, the leaf could be composed of single piezoelectric members as shown in FIG. 28. In this example, element 534a is laminated between a relatively thin electrode 538 and a relatively thick electrode 539 which is relatively less elongatable than electrode 538, and element 533a is similarly laminated between a thin electrode 538 and a thick electrode 539; and the piezoelectric elements 533a and 534a are reverse-polarized with respect to one another and are series connected as in FIG. 24.

Figure 25:
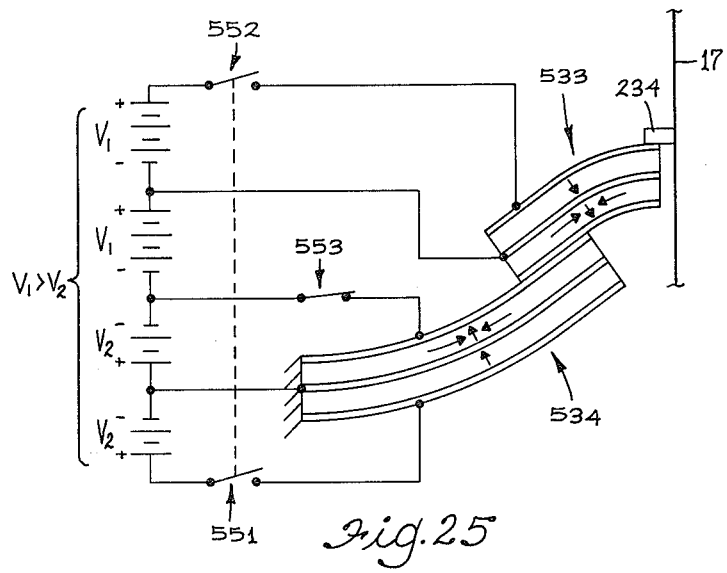
FIG. 25 is a perspective view, partly schematic, illustrating another variational form of the inventive structure.

A further variation is shown in FIG. 25 in which the members 533 and 534 are formed and laminated as in FIG. 24, but are parallel-connected to sources $V_1$ and $V_2$.

Another feature of either the two-plate single element or the dual element lies in wiring the element electrode pairs separately, as shown in FIG. 25, and applying different deflecting voltages $V_1 > V_2$ to each set in circuits analogous to those of FIG. 23, controlled by switches 551, 552 and 553. This still creates an "S" shaped deflection, but the radius of curvature of each element is controlled separately, thus making it possible for an ideal motion to occur where each element length is other than one-half the original length.

The physical definition of the sense strip 270 defined by gap 274 (FIGS. 12 and 21A, 21C) that is used for feedback in the servo system has several alternatives depending on how the element pairs are defined within the single element. The sense strip can be cut to an equivalent length of the inner element, as shown in FIG. 21A, as by continuing the gap 510 as a gap 510a. Its deflection then would remain as a simple cantilevered bend and its output would be proportional to its deflection. Due to the fact, however, that the transducer 234 itself would not be attached at a position equivalent to the sense strip length, some erroneous information may be given by the sense strip 270 as to the true location of the transducer. If more accurate information relative to the position of the head is required, the length of the sense strip can be extended as shown in FIG. 21C, as by locating the gap 510a farther outboard than gap 510, and even up to a full length of the element, such that a reduction in the sense strip output can occur. The sense strip acts, of course, as a generator with output proportional to deflection. However, if deflection is in two opposite directions (i.e., "S" shaped), the total output will be a difference of the outputs resulting from each directional bend so it can be seen that the absolute output of the sense strip can be widely varied depending on its final geometry.

When the transverse groove 510a defining the sense strip length is not a prolongation of the groove 510 defining the piezoelectric elements, it appears advisable to provide a matching groove 274a on the bottom of the leaf, opposite to the groove 274 defining the sense strip side.

The removal of sections of the electrode can be accomplished either by chemical etching or mechanical grinding and due to the thinness of the electrode film (approximately 0.0005 in.), the process poses no serious physical deterioration of the element itself. The removal of this electrode, however, must be done with some precision in order to keep it parallel to the base mounting. If this is not done, the "S" movement may not be pure and certain azimuth errors may develop.

One further variational embodiment of the invention is illustrated in FIG. 27, wherein electrodes of inner and outer portions of the assembly are further divided longitudinally by means of a pair of grooves 561 and 561a for the purpose of providing controlled twist of the leaf about a longitudinal axis, to correct for head azimuth errors in the contact of head and tape. Since the head in recording operation moves diagonally across the tape while the tape is moving longitudinally, the head width often is skewed at a slight angle to the length of the actual track on the tape, giving rise to azimuth error under some circumstances such as when the tape is played back in slow or stop motion, or when there is imprecise attachment of the positioning element to its support element. Correction can be made with the arrangement of FIG. 27, in which the electrodes are divided into upper inner electrodes 511a and 511b, each of which is cross-wired to a corresponding outer lower electrode 512a and 512b, respectively; and inner lower electrodes 514a and 514b, each of which is cross-wired to a corresponding outer upper electrode 515a and 515b, respectively. Electrodes 511b and 514b are then coupled, along with central electrode 248, to voltage sources (not shown) as by means of leads 254a and 256a, these latter sources being similar to the sources to which electrodes 511a and 514a are coupled, but being of different value, i.e., sources that are separate but unequal. The difference in value of the separate voltage sources represents a predeterminable bias voltage producing a predeterminable twist in the leaf to correct for azimuth error. These voltages, of course, could be servo controlled by automatic and continuously compensated azimuth correction. In the illustrated arrangement, the grooves 274 and 274a, 510 and 510a, remain unchanged, together with the electrical coupling of the sense strip 270.

Thus there has been described a system mounting a magnetic transducer on the end of a thin leaf for sweeping motion displacement laterally to a track on a record surface, the present invention utilizes elements arranged as reversely deflectable leaf portions so as to maintain the transducer in substantially undeviating (normal) orientation with respect to the record surface. In one embodiment, the cantilevered leaf is composed of inner and outer (inboard and outboard) piezoelectric ("bimorph") bender elements having opposite polarizations and being cross-wired to produce the reverse deflections desired. The electrodes of the elements may also be divided longitudinally and coupled to bias voltage sources to provide controlled correction of azimuth error.

I claim:

1. Structure for mounting a magnetic transducing head in transducing relation with an elongated track of a magnetic record medium, comprising:
   a support element;
   a magnetic transducing head; and
   a positioning member attached to said support element, said head mounted to said positioning member to be in transducing relation to the record medium, said positioning member having a plurality of independently deflectable portions for displacement of the mounted head in directions lateral to said elongated track.

2. The structure as described in claim 1, wherein:
   said positioning member has a base portion attached to the support element so as to be fixed with respect thereto against bodily translation and against bodily rotation in at least all but the lateral displacement directions;
   said positioning member is substantially rigid in the dimensions thereof orthogonal to said lateral directions;
   said positioning member has a head mounting portion with one of said reversely deflectable portions terminating therein;
   said head being mounted on said head mounting portion of said positioning member.

3. The structure as described in claim 1, wherein:
   said positioning member is a leaf element that is flexible in said lateral directions.

4. The structure as described in claim 3, wherein:
   said leaf element is a piezoelectric bender element having axes of polarization extending in said lateral directions.

5. The structure as described in claim 4, wherein:
said leaf element is formed of two piezoelectric ceramic plates bonded to an intervening substrate to form an assembly and said assembly is sandwiched between two pairs of electrodes, each pair of electrodes corresponding with one of said reversely deflectable portions of said leaf elements.

6. The structure as described in claim 5, wherein:
said piezoelectric ceramic plates are arranged to have oppositely directed axes of polarization and electric leads are coupled to said two pairs of electrodes for the application of driving potentials thereto, the polarity of said driving potentials applied to one pair of electrodes being opposite to that of the driving potential applied to the other pair.

7. The structure as described in claim 6, wherein:
the two pairs of electrodes associated with the assembly are formed of electrically discontinuous conductors on outwardly facing surfaces of the respective piezoelectric ceramic plates distal the substrate, each electrically discontinuous conductor having a discontinuity at a location between the support element and the mounted head to form two electrically isolated electrode portions.

8. The structure as described in claim 5, wherein:
said substrate is a conductor and serves as an electrode for each of the two piezoelectric ceramic plates, said substrate having an electric lead coupled thereto for the application of a driving potential thereto.

9. The structure as described in claim 1, wherein:
said positioning member has a head mounting portion with one of said deflectable portions terminating therein, and said head is mounted on said head mounting portion of said positioning member.

10. The structure as described in claim 1, wherein:
said positioning member is a piezoelectric bender element leaf extending between the support element and the head and formed of at least one piezoelectric ceramic member sandwiched between a pair of electrodes, at least one of the electrodes of said pair of electrodes being electrically discontinuous at least at one location between the support element and head to form electrically isolated electrode portions and define the reversely deflectable portions;
said piezoelectric ceramic member is arranged to have oppositely directed axes of polarization in adjacent reversely deflectable portions; and
means for applying driving potentials electrodes are coupled to said electrodes so that the driving potentials applied to adjacent reversely deflectable portions are of opposite polarity.

11. The structure as described in claim 10, wherein:
said discontinuous electrode has one electrical discontinuity.

12. The structure as described in claim 11, wherein:
said electrical discontinuity is located approximately mid-way in the discontinuous electrode between the support element and the head.

13. The structure as described in claim 10, wherein:
said piezoelectric bender element is formed of two piezoelectric ceramic members bonded to an intervening substrate, and said ceramic members are sandwiched between said a pair of electrodes;
each electrode being electrically discontinuous at the same locations between the support element and the head to establish in each ceramic member reversely deflectable portions aligned with reversely deflectable portions in the other ceramic member.

14. The structure as described in claim 10, further comprising:
a piezoelectric generator element physically joined by said positioning member for displacement with the piezoelectric bender element and for generating an output signal indicative of the instantaneous deflection of the head.

15. The structure as described in claim 14, wherein:
the piezoelectric generator element has a piezoelectric ceramic member sandwiched between a pair of generator electrodes, at least one of the generator electrodes being electrically isolated from the electrodes of the positioning member; and
the generator electrode that is electrically isolated from the positioning member electrodes terminates at a location between the support element and head.

16. The structure as described in claim 15, wherein:
the generator electrode terminates at the same location between the support element and head as the discontinuity of the electrically discontinuous positioning member electrode.

17. The structure as described in claim 15, wherein:
the termination point of the generator electrode is located closer to the head then the electrical discontinuity in the positioning member electrode.

18. The structure as described in claim 1, wherein:
the reversely deflectable portions are provided in said member for displacement of the head without substantial deviation of the orientation of confronting surfaces of the head and record medium.

19. The structure as described in claim 1, wherein:
said positioning member is a piezoelectric bender element leaf extending between the support element and the head and formed of at least one piezoelectric ceramic member sandwiched between a pair of electrodes; and
means for applying driving potentials to said pair of electrodes to energize the ceramic member to deflect adjacent portions of the piezoelectric element in reverse directions.

20. The structure as described in claim 19, wherein:
the piezoelectric ceramic member has oppositely directed axes of polarization in adjacent reversely deflectable portions; and
the means for applying driving potentials to the pair of electrodes are coupled to said electrodes so that the polarity of the driving potential applied to each reversely deflectable portion is aligned with axis of polarization of said portion.

21. The structure as described in claim 10, wherein:
each of said electrodes also has an electrical discontinuity in the direction which extends between the support element and the head to form electrically isolated longitudinal electrode portions; and
means are provided for separately applying driving potentials to each of said longitudinal electrode portions for controlling azimuthed skewing of said head.

22. The structure as described in claim 21, wherein:
the electrical discontinuity of each electrode is located mid-span of the electrode.

23. The structure as described in claim 1, wherein:
said reversely deflectable portions are first portions distributed along a first longitudinal axis of said positioning member, and said positioning member also having a plurality of second independently deflectable portions distributed along a second axis transverse to said first axis for controlling azimuthal skewing of said head with respect to said track.

24. Structure for mounting a magnetic transducing head upon a support element and in transducing relation with an elongated track of a magnetic record medium, comprising:
a positioning member adapted to be attached to said support element, said positioning member having a portion for mounting said head in transducing relation to the record medium; and
means for forming a plurality of independently deflectable portions in said positioning member for displacement of the mounted head in directions lateral relative to said track.

25. The structure as described in claim 24, wherein:
one of said deflectable portions terminates in the head mounting portion of said positioning member.

26. The structure as described in claim 24, wherein:
the reversely deflectable portions are provided in said positioning member for displacement of the head without substantial deviation of the orientation of confronting surfaces of the head and record medium.

27. The structure as described in claim 24, wherein:
said positioning member is a piezoelectric bender element having one end portion adapted to be attached to the support element and an opposite end portion for mounting said head, said bender element formed of at least one piezoelectric ceramic member sandwiched between a pair of electrodes, at least one of the electrodes of said pair of electrodes electrically discontinuous at least at one location between said end portions to form electrically isolated electrode portions corresponding with the reversely deflectable portions;
said piezoelectric ceramic member is arranged to have oppositely directed axes of polarization in adjacent reversely deflectable portions; and
means for applying driving potentials are coupled to said electrodes so that the driving potentials applied to adjacent reversely deflectable portions are of opposite polarity.

28. The structure as described in claim 27, wherein:
said piezoelectric bender element is formed of two piezoelectric ceramic members bonded to an intervening substrate, and said ceramic members are sandwiched between said pair of electrodes;
each electrode being electrically discontinuous the same locations along the extent between the end portions to establish in each ceramic member reversely deflectable portions aligned with reversely deflectable portions in the other ceramic member.

29. The structure as described in claim 27, further comprising:
a piezoelectric generator element physically joined to said positioning member for displacement with the piezoelectric bender element and for generating an output signal indicative of the instantaneous deflection of the head mounted to the head mounting portion of the positioning member.

30. The structure as described in claim 29, wherein:
the piezoelectric generator element has a piezoelectric ceramic member sandwiched between a pair of generator electrodes, at least one of the generator electrodes being electrically isolated from the electrodes of the positioning member; and
the generator electrode that is electrically isolated from the positioning member electrodes terminating at a location between the end positions.

31. The structure as described in claim 30, wherein:
the generator electrode terminates at the same location between the support element and head as the discontinuity of the electrically discontinuous positioning member electrode.

32. The structure as described in claim 30, wherein:
each of said electrically discontinuous positioning member electrodes has one electrical discontinuity; and
the termination point of the generator electrode is located closer to the head mounting portion of the positioning member than the electrical discontinuities in the positioning member electrodes.

33. The structure as described in claim 24, wherein:
said positioning member is a piezoelectric bender element extending between an end adapted to be attached to the support element and the head mounting portion and formed of at least one piezoelectric ceramic member sandwiched between a pair of electrodes; and
means are provided for applying driving potentials to said pair of electrodes to energize the ceramic member to deflect adjacent portions of the piezoelectric element in reverse directions and thereby form said plurality of reversely deflectable portions.

34. The structure as described in claim 33, wherein:
each electrode of said pair of electrodes has an electrical discontinuity in the direction which extends between the end adapted to be attached to the support element and the head mounting portion to form electrically isolated longitudinal electrode portions; and
means are provided for separately applying driving potentials to each longitudinal electrode portion for controlling azimuthal skewing of the head on the head mounting portion.

35. The structure as described in claim 24, wherein:
said reversely deflectable portions are first portions distributed along a first longitudinal axis of said positioning member; and
means are provided for forming second independently deflectable portions in said positioning member distributed along a second axis transverse to said first axis for controlling azimuthal skewing of the head on the head mounting portion with respect to said track.

36. Structure for mounting a magnetic transducing head upon a support element and in transducing relation with an elongated track of a magnetic record medium, said head having a transducing gap defined by orthogonal length, width and depth dimensions with the gap length dimension in the length direction of the track, comprising:
a positioning member adapted to be attached to said support element, said positioning member having a portion for mounting said head in transducing relation to the record medium; and
means for forming a plurality of independently deflectable portions distributed only in the direction of the gap length for controlling azimuthal skewing of the head on the head mounting portion.

37. The structure as described in claim 36, wherein:

said positioning member is a piezoelectric bender element extending between an end adapted to be attached to the support element and the head mounting portion and formed of at least one piezoelectric ceramic member sandwiched between a pair of electrodes; and each electrode of said pair of electrodes has at least one electrical discontinuity in the direction of the gap depth to form electrically isolated longitudinal electrode portions corresponding with the independently deflectable portions.

38. The structure as described in claim 37, wherein: each electrically isolated longitudinal electrode portion includes means for separately applying driving potentials thereto for controlling azimuthal skewing of the head on the head mounting portion.

39. The structure as described in claim 38, wherein: each electrode has a single electrical discontinuity located mid-span.

* * * * *